(12) United States Patent
Lebbos et al.

(10) Patent No.: US 12,014,639 B2
(45) Date of Patent: Jun. 18, 2024

(54) PROCESSES FOR SAVING FUEL FOR AN AIRCRAFT FLIGHT

(71) Applicant: Airbus SAS, Blagnac (FR)

(72) Inventors: Imad Lebbos, Blagnac (FR); Daniel Percy, Blagnac (FR)

(73) Assignee: Airbus SAS, Blagnac (FR)

( * ) Notice: Subject to any disclaimer, the term of this patent is extended or adjusted under 35 U.S.C. 154(b) by 865 days.

(21) Appl. No.: 16/951,896

(22) Filed: Nov. 18, 2020

(65) Prior Publication Data
US 2021/0192961 A1 Jun. 24, 2021

Related U.S. Application Data

(60) Provisional application No. 62/937,500, filed on Nov. 19, 2019.

(51) Int. Cl.
| | |
|---|---|
| *B64F 5/60* | (2017.01) |
| *G01C 21/20* | (2006.01) |
| *G05D 1/00* | (2006.01) |
| *G08G 5/00* | (2006.01) |

(52) U.S. Cl.
CPC ............ *G08G 5/0039* (2013.01); *B64F 5/60* (2017.01); *G01C 21/20* (2013.01); *G05D 1/042* (2013.01); *G05D 1/104* (2013.01)

(58) Field of Classification Search
CPC ......... B64F 5/60; G01C 21/20; G05D 1/0005; G05D 1/042; G05D 1/104
See application file for complete search history.

(56) References Cited

U.S. PATENT DOCUMENTS

| | | | |
|---|---|---|---|
| 10,860,115 B1 * | 12/2020 | Tran ...................... | G06F 3/0346 |
| 2016/0071421 A1 * | 3/2016 | Bousquet ............... | G05D 1/104 |
| | | | 701/467 |
| 2020/0033892 A1 * | 1/2020 | Aldarwish ............ | B64D 45/08 |

OTHER PUBLICATIONS

Blake W. Surfing aircraft vortices for energy (Year: 2015).*
Okolo W. Benefits of Formation Flight of Extended Duration Considering Fuel Burn (Year: 2015).*

* cited by examiner

*Primary Examiner* — Charles J Han
(74) *Attorney, Agent, or Firm* — Greer, Burns & Crain, Ltd.

(57) ABSTRACT

A process for pairing two aircraft together to save fuel. After evaluating whether two aircraft may possibly be paired together in a formation for fuel savings, the process determines new flight plans for both aircraft, allowing the second aircraft to save fuel by flying behind the first aircraft so that the second aircraft utilizes the energy of the wake vortices generated by the first aircraft. Based on the new flight plan, the process determines if there is a net trip fuel savings for the pair.

17 Claims, 10 Drawing Sheets

PROCESSES FOR SAVING FUEL FOR AN AIRCRAFT FLIGHT

RELATED APPLICATIONS

This application claims priority to U.S. Provisional Patent Application No. 62/937,500 filed on Nov. 19, 2019, the entirety of which is incorporated herein by reference.

BACKGROUND

An aircraft in flight generates two wake vortices in its wake—one from each of the wings. From the wings, these wake vortices first tend to move closer to each other, then maintain a more or less constant distance between them while losing altitude in relation to the altitude at which they were generated.

In a known manner, the position of the centers, as well as the circulation strengths of the vortices, generated by an aircraft can be calculated from flight parameters of the aircraft such as the mass, the altitude, the roll angle, the aerodynamic configuration, span, air density at the point of flight, speed, etc.

It may be beneficial for a second aircraft, which will be called a follower aircraft, to be able to calculate the positions of the wake vortex centers generated by a first or leader aircraft, in order to fly in formation behind the leading aircraft in the upwash region of the trailing vortices, to take advantage of their energy, and thus reduce its fuel consumption.

It is believed that the second aircraft wishing to benefit from the wake vortices of the leading aircraft must be within three (3) nautical miles ("NM") behind the leading aircraft.

Currently, devices exist which are known for calculating the circulation strength of wake vortices generated by a leading aircraft in order to allow a follower aircraft to know the distribution of the upward winds generated relative to the center of a vortex, and to take a position so as to take advantage effectively of the vortices.

However, it is believed that there are no devices or methods for bringing together a potential pair of a leader and a follower aircraft from their initial points of flight and arranging the follower behind the leader aircraft to form a fuel saving formation.

This may be due to the fact that aircraft flight plans are determined in advance and filed by the airlines before the appropriate government authorities. Also, it is unusual for a pilot to significantly modify a flight plan once it has been deposited with the competent authorities (ATC, . . . ). A further difficulty lies in the determination of possible pairs (leader-follower) because of the number of airplanes in the air at the same time, with different routes, different directions, and the choice of pairs that have an interest in terms of fuel savings. For example, every day between two and three thousand aircraft fly across the North Atlantic.

Therefore, there is a need for a method and system that is able to effectively and efficiently form a pair of flights that may be able to be paired into a flight formation that generates fuel savings.

SUMMARY OF THE INVENTION

The present invention relates to a method and a system that enables identifying, assessing, and validating flight plan modifications to enable trip fuel savings for a potential follower aircraft by flying in formation with a leader aircraft. Generally, the present processes and systems identify, for a given flight of a commercial aircraft transporting either passengers or freight, all other possible flights (of any aircraft type) to carry out a formation flight with, in order to allow net trip fuel savings for the pair of aircraft compared to their original flight plans which do not include flying in formation. The invention offers strategies to enable two aircraft to meet together and for one (i.e. the follower aircraft) to place itself in the desired position in the wake of the other (i.e. the leader aircraft) for generating fuel savings, while also offering ways to increase the net trip fuel savings by modifying the original flight plans of both of the aircraft. These identified flights must comply with operator preferences and are subject to validation phases by the aircraft operators and air navigation service providers. The present invention aims at having a system which enables formation flight for either cargo or passenger aircraft.

Accordingly, in a first aspect, the present invention may be generally characterized as providing a process for pairing two aircraft together to save fuel by adjusting the flight plans of the two aircraft by: identifying a possible pair of aircraft from a database of aircraft flight plans, the possible pair of aircraft including a leader aircraft and a follower aircraft, each aircraft having an initial flight plan; modifying the initial flight plan of the leader aircraft to provide a new flight plan; modifying the initial flight plan of the follower aircraft to provide a new flight plan, wherein the new flight plan includes a common ground section which overlaps with the new flight plan of the leader aircraft so that the follower aircraft flies in an upwash region of the wake vortices of the leader aircraft; determining if there is a net trip fuel savings associated with the possible pair of aircraft based on the leader aircraft utilizing the new flight plan instead of the initial flight plan and the follower aircraft utilizing the new flight plan instead of the initial flight plan; and, when there is a net trip fuel savings, replacing the initial flight plans of both the leader aircraft and the follower aircraft in the database with the new flight plans.

Identifying a possible pair of aircraft from a database of aircraft flight plans may include applying a first criteria against each possible pair of aircraft. The first criteria may include: determining that the leader aircraft and the follower aircraft are both airborne at the same time for a certain time period; or, determining that the initial flight plan of the leader aircraft and the initial flight plan of the follower aircraft have an overlapping section; or, determining that the initial flight plan of the leader aircraft and the initial flight plan of the follower aircraft have an overlapping section and that the two aircraft are not further than 300 NM apart at a beginning of the overlapping section; or, a combination thereof. The first criteria may include: determining that the leader aircraft and the follower aircraft are both airborne at the same time for a certain time period; or, determining that the initial flight plan of the leader aircraft and the initial flight plan of the follower aircraft have the same general direction; or, determining that a maximum allowable added travel distance of 700 NM for the follower aircraft is not exceeded; or determining that the two aircraft are not further than 300 NM apart at a beginning of the overlapping section whether the overlapping section is resulting from the follower aircraft's initial flight plan or the modified one; or a combination thereof. The first criteria may also include: types of the leader aircraft and the follower aircraft; or, airlines of the leader aircraft and the follower aircraft; or, airline preferences for pairing choices; or, a combination thereof.

Modifying the flight plan of the leader aircraft to provide a new flight plan may include adjusting a speed, an altitude, or both to reach a point in a fuel savings formation. Alternatively or additionally, modifying the flight plan of the leader aircraft to provide a new flight plan may include adjusting a merge point, a split point, or both, the merge point representing an initial waypoint in the common ground section and the split point representing a final waypoint in the common ground section.

Determining if there is a fuel savings associated with the possible pair of aircraft may include: determining takeoff weights of both the follower aircraft and the leader aircraft; determining a weight of the leader aircraft throughout the initial flight plan of the leader aircraft; determining a weight of the leader aircraft throughout the new flight plan of the leader aircraft; determining a weight of the follower aircraft throughout the initial flight plan of the follower aircraft; and, determining a weight of the follower aircraft throughout the new flight plan.

The process may further include, continuously applying a second criteria between the merge and the split point and then if the second criteria is satisfied and there is a net trip fuel savings, replacing the initial flight plans in the database with the new flight plans. The second criteria may include continuously comparing the speed envelope of the leader aircraft with the speed envelope of the follower aircraft making sure that any given Mach number and/or altitude they fly at together is compatible with their respective flyable domains of speed and altitude.

The database may be updated automatically based on a preselected preference.

In a second aspect, the present invention may broadly be characterized as providing a process for pairing two aircraft together to save fuel by adjusting the flight plans of the two aircraft by: identifying a possible pair of aircraft from a database of aircraft flight plans, the possible pair of aircraft including a leader aircraft and a follower aircraft, each aircraft having an initial flight plan, and each initial flight plan having a plurality of waypoints along the flight plan; modifying the initial flight plan of the leader aircraft to provide a new flight plan, wherein the new flight plan of the leader aircraft includes the same waypoints as the initial flight plan of the leader aircraft; modifying the initial flight plan of the follower aircraft to provide a new flight plan, wherein the new flight plan of the follower aircraft includes a common ground section which overlaps with the new flight plan of the leader aircraft so that the follower aircraft flies in an upwash region of the wake vortices of the leader aircraft, and wherein the new flight plan of the follower aircraft includes the same waypoints as the initial flight plan of the follower aircraft; determining if there is a net trip fuel savings associated with the possible pair of aircraft based on both of the aircraft utilizing the new flight plans instead of using the initial ones; and, when there is a net trip fuel savings, replacing the initial flight plans in the database with the new flight plans.

It is contemplated that the new flight plan of the follower aircraft includes at least one new waypoint that is not in the initial flight plan of the follower aircraft.

In a third aspect, the present invention may be characterized, generally, as providing a process for pairing two aircraft together to save fuel by adjusting the flight plans of two aircraft by: identifying a possible pair of aircraft from a database of aircraft flight plans, the possible pair of aircraft including a leader aircraft and a follower aircraft, each aircraft having an initial flight plan, and each initial flight plan having a plurality of waypoints along the flight plan; modifying the initial flight plan of the leader aircraft to provide a new flight plan, wherein the new flight plan of the leader aircraft includes at least one new waypoint that is not in the initial flight plan of the leader aircraft; modifying the initial flight plan of the follower aircraft to provide a new flight plan, wherein the new flight plan includes a common ground section which overlaps with the new flight plan of the leader aircraft so that the follower aircraft flies in an upwash region of the wake vortices of the leader aircraft; determining if there is a net trip fuel savings associated with the possible pair of aircraft based on the aircraft utilizing the new flight plans instead of the initial flight plans; and, when there is a net trip fuel savings, replacing the initial flight plans in the database with the new flight plans.

The new flight plan of the follower aircraft may include at least one new waypoint that is not in the initial flight plan of the follower aircraft.

The common ground section includes a merge point at a beginning and a split point at an end.

The merge point may be based on a new waypoint from the at least one new waypoint that is not in the initial flight plan of the follower aircraft. The split point may be based on a new waypoint from the at least one new waypoint that is not in the initial flight plan of the follower aircraft. The split point may be based on a first new waypoint from the at least one new waypoint that is not in the initial flight plan of the follower aircraft, and the merge point may be based on a second new waypoint from the at least one new waypoint that is not in the initial flight plan of the leader aircraft.

The merge point may be based on a new waypoint from the at least one new waypoint that is not in the initial flight plan of the leader aircraft. The split point may be based on a new waypoint from the at least one new waypoint that is not in the initial flight plan of the leader aircraft. The split point may be based on a first new waypoint from the at least one new waypoint that is not in the initial flight plan of the leader aircraft, and the merge point may be based on a second new waypoint from the at least one new waypoint that is not in the initial flight plan of the leader aircraft.

These and other aspects and embodiments of the present invention will be appreciated by those of ordinary skill in the art based upon the following description of the drawings and detailed description of the preferred embodiments.

DETAILED DESCRIPTION OF THE DRAWINGS

One or more exemplary embodiments of the present invention will be described below in conjunction with the following drawing figure, in which.

DETAILED DESCRIPTION OF THE INVENTION

As noted above, the present invention provides processes for comparing flights to determine if there is a fuel savings by pairing the aircraft together so that a follower aircraft may utilize the wake vortices of a lead aircraft. According to the present processes, the flight plans of the aircraft are adjusted. In some embodiments, the waypoints of one or both of the aircraft are kept the same and only the speed and/or altitude are adjusted or modified. In some embodiments, new waypoints are determined for one or both of the aircraft. If the new flight plans provide a fuel savings, the new flight plans may be used for the leader aircraft and the follower aircraft, respectively.

With these above general aspects of the present invention in mind, one or more embodiments of the present invention will be described with the understanding that the following description is not intended to be limiting.

Figure 1:
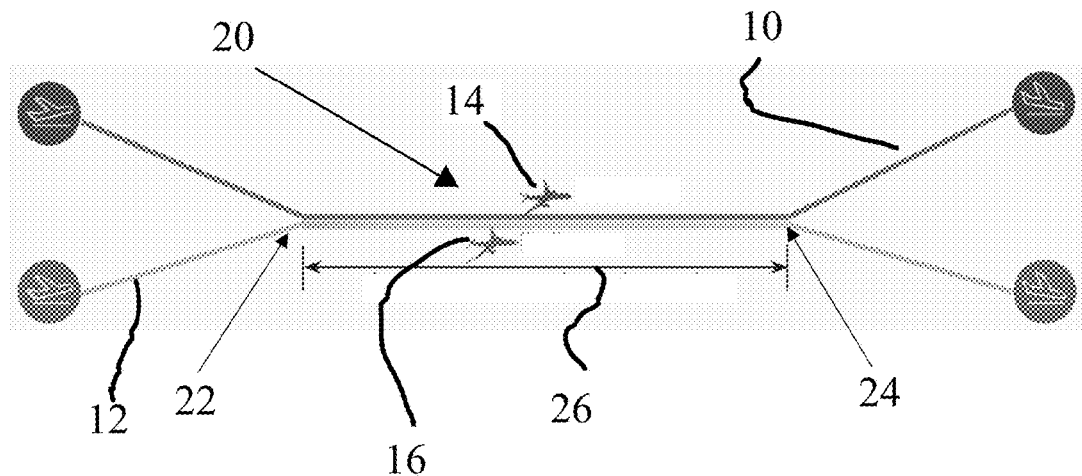
FIG. 1 is a schematic representation of two flights having flight plans that overlap that may be analyzed according to one or more embodiments of the present invention.

According to the present invention, as shown in FIG. 1, the flight plans 10, 12 of two aircraft 14, 16 are utilized to provide an opportunity for fuel savings by pairing the flights 14, 16 so that a follower aircraft 16 may take advantage of the wake vortices of a leader aircraft 18. The pairing provides a formation flight 20 between a merge point 22 and a split point 24. The merge point 22 is one of the first waypoints, in both flights' cruise phases of their flight plans 10, 12, from which the ground tracks indicated in the two flight plans 10, 12 overlap one another. In other words, the merge point 22 is the start of a common section 26. The split point 24 is one of last common waypoints before either of the two aircraft 14, 16 initiates a final descent phase of its flight plan 10, 12. In other words, the split point 24 is the end of a common section 26.

The two flights 10, 12 may be planning to use the same routes to get from their departure airports to their destination airports. Their planned routes geographically overlap one another producing the common ground track section 26. On this shared route, the present process implements a fuel saving formation flight between the two aircraft 14, 16, one playing the role of the leader aircraft 14 while the other plays the role of the follower aircraft 16.

For example: a flight going from Paris CDG to Los Angeles LAX and another one going from Frankfurt FRA to San Francisco SFO often have their planned routes overlapping each other, merging together above British airspace and splitting over American airspace. Between the merge point 22 and the split point 24 is the common ground track section 26 where a formation flight 20 may be considered according to the present processes.

The present processes also contemplate that the flights may be planning to depart from the same airport and/or heading to the same destination airport. For example: two aircraft departing from Los Angeles LAX airport, one going to Sydney and the other to Melbourne, often happen to share a common ground track going from the departure airport to a splitting point somewhere off the eastern coast of Australia. The same logic applies the other way on their flights back to LAX.

For cases where both aircraft 14, 16 depart from the same airport, the merge point 22 is one of the first common waypoints where both aircraft 14, 16 have completed the initial climb phase of their flight plans 10, 12. When both aircraft 14, 16 are heading to the same destination airport, the split point 24 is one of the last common waypoints through which the two aircraft 14, 16 fly before either of the aircraft 14, 16 initiates the final descent phase of their flight plans 10, 12.

In one embodiment of the present invention, in the case of a formation flight 20 taking place over the common section 26, the waypoints indicated in the original flight plans of both aircraft 14, 16 will not be changed for merging and flying in formation. Rather, only the time of reaching these waypoints, altitudes, and speeds will be changed. Thus, implementing the formation flight 20 requires the aircraft 14, 16, to accelerate or decelerate in flight, in order to close the gap between the leader aircraft 14 and the follower aircraft 16, and then have the two aircraft flying together in a fuel saving formation at optimized altitudes and speeds, all through the common section 26. "Close the gap" means, for instance, that the follower aircraft 16 is positioned at a 3 NM distance behind the leader aircraft 14 in order to take advantage of/benefit from the energy of the wake vortices.

Figure 2:
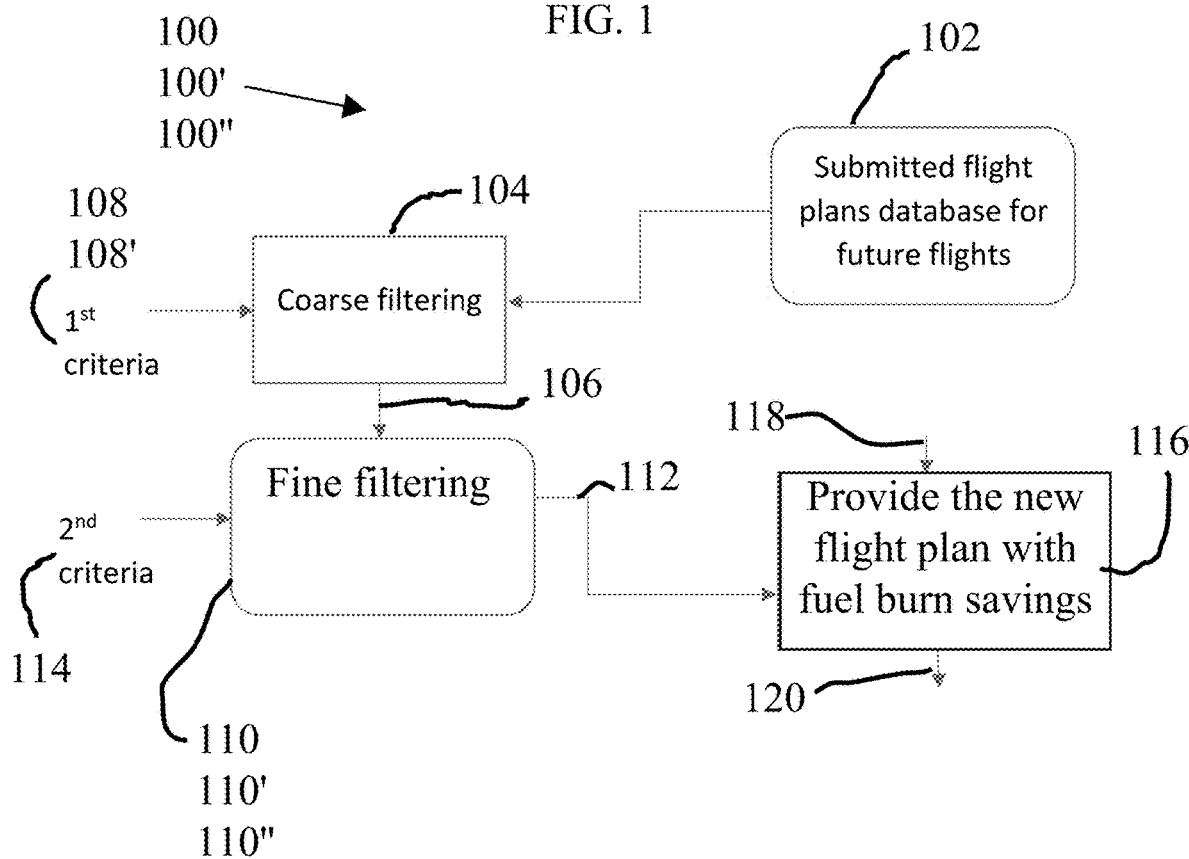
FIG. 2 is a process flow diagram of one or more processes according to the present invention.

Turning to FIG. 2, an exemplary process 100 according to the present invention describes how to determine if two aircraft 14, 16 may utilize a formation flight 20 in order to reduce fuel consumption.

Flight Plans Database for Future Flights

The present processes 100 rely on data in a database of future flights 102. The database of future flights 102 includes the flight plans of commercial aircraft Each flight plan is assigned a flight number and includes information such as the type of aircraft that will be making the flight. The flight plan also includes the requested waypoints to fly through, and for each of these waypoints, the associated speed, time of passage, and desired altitude of the aircraft at these waypoints.

Coarse Filtering

Accordingly, the process 100 includes a coarse filtering step 104 which filters the large number of flight plans in the database 102 and so the even larger number of potential leader-follower combinations by keeping only a limited number of possible follower-leader pairs 106 satisfying a specified first filtering criteria 108. It should be appreciated that the terms "follower" and "leader" are in relation to the common ground track section 26 and that these terms are arbitrarily utilized when subjecting a pair to coarse filtering 104.

Generally, the present processes 100 include evaluating the operational feasibility of each candidate pair against the first, or course, filtering criteria 108. The coarse filtering criteria 108 may include: during a certain time period both aircraft of a potential pair must be airborne; the pair should have overlapping routes for a significant part of the flight; the two aircraft must not be flying further than 300 NM apart at the beginning of their overlapping route section. If the pair meets the criteria 108, the process proceeds 100 with a fine filtering step 110 for each possible pair 106.

Calculation Module: Determination of the Pairs of Interest (Fine Filtering):

In the fine filtering step 110 of the process 100, for each possible pair of flights 106, the process 100 analyzes whether a modification to one or both of the initial flight plans for the leader and follower aircraft to fly in formation over the common ground track section can generate net trip (i.e., entire flight) fuel burn savings for the pair (considered as a whole/in its entirety). If there is a benefit, it is considered to be a pair of interest 112. In this embodiment of the invention, only the speed and altitude profile of the aircraft are modified and compared to their initial flight plan. Therefore, the time at which the aircraft reach each waypoint of their initially planned routes may be impacted but not the routes themselves.

Figure 3:
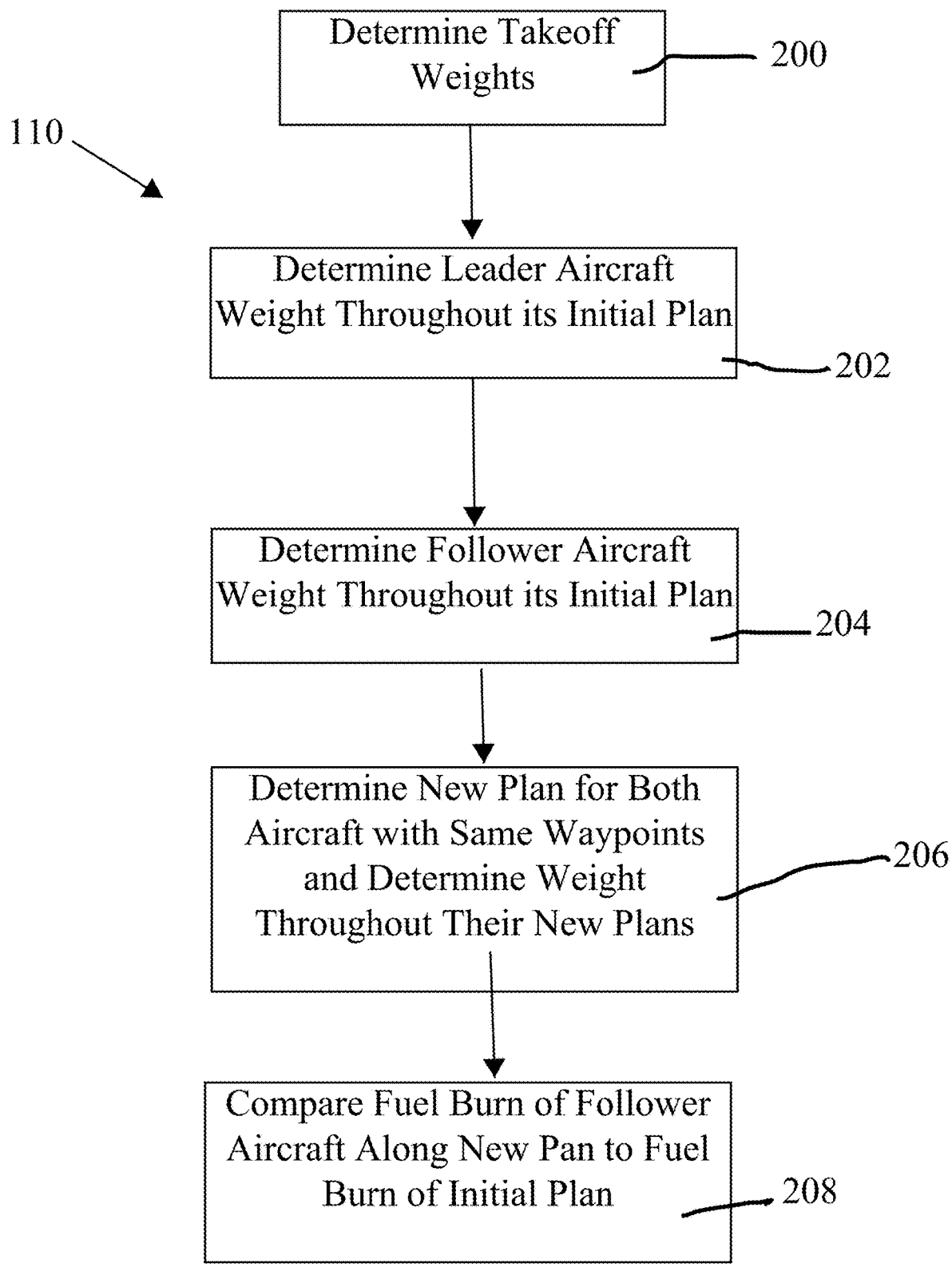
FIG. 3 is a process flow diagram of an aspect of the processes according to the present invention.

In the fine filtering step 110, all phases of the flight for both the leader aircraft and the follower aircraft from their respective departure to the arrival airports are simulated. The phases of the flight include taxi, takeoff, climb, cruise, descent, possible holding, final approach, and landing. By using each aircraft's associated flight performance, fuel consumption models, and data, the weight of each aircraft throughout its respective flight may be determined. FIG. 3 depicts an embodiment of the fine filtering step 110.

As shown in FIG. 3, the fine filtering step 110 includes a step 200 of determining the takeoff weights for both aircraft in the possible follower-leader pairs 106. The takeoff weights may be communicated by the airlines. For example, the takeoff weights may be in the database 102 (FIG. 2). If takeoff weights for one or both aircraft are not available, they may be estimated for a given flight by knowing the weight characteristics of the aircraft, the length of the flights through the waypoints listed in the flight plans, and considering reasonable passenger load factors, i.e. cabin filling rate, e.g. 80%. Alternatively, these weights could be estimated through a statistical study of historical flights, by studying the recorded flight profiles from previous flights and comparing them to the performance capabilities for different weights of the given aircraft types. These estimates are sufficient for identifying candidates. The database may later on be updated with correction factors which will be adjusted as a historical database of formation flights is filled with the actual fuel savings reported.

Continuing on in FIG. 3, the fine filtering step 110 also includes a step 202 of determining the leading aircraft's weight throughout its unchanged initial flight plan. The weight of the leading aircraft is an important factor in determining the wake circulation's strength of the generated wake vortex—which has a direct impact on the follower aircraft's fuel savings.

For this step 202, for instance, the different phases of flight of the leader aircraft are simulated. Specifically, using performance models data and knowing the takeoff weight determined in step 200, the fuel burn value of the aircraft every step of the flight may be determined. Performance models provide data, for a given aircraft model, regarding fuel consumption, travelled distance and time needed for any given phase of flight, function of weight, altitude, speed, configuration of the aircraft, and International Standard Atmosphere ("ISA") conditions. (ISA is a static atmospheric model of how the pressure, temperature, density, and viscosity of the Earth's atmosphere change over a wide range of altitudes or elevations.)

Figure 4:
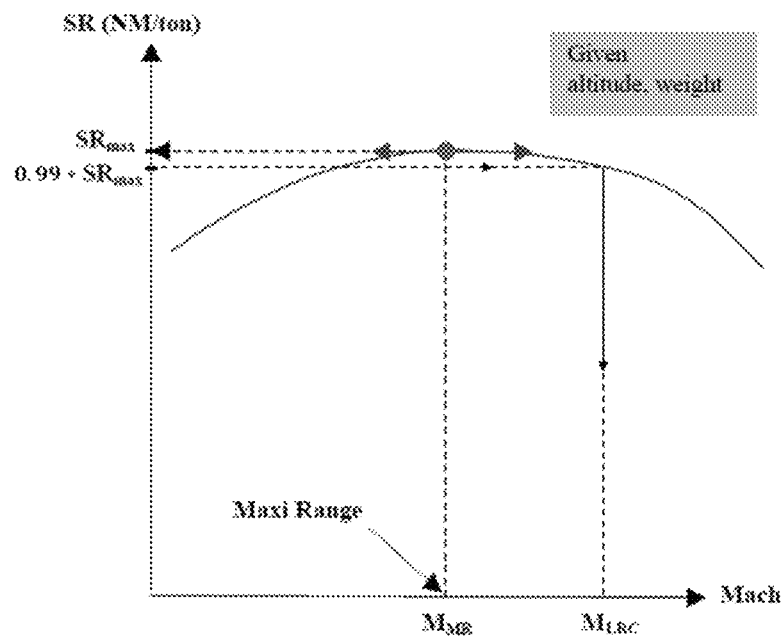
FIG. 4 is a graph illustrating the evolution of the SR criteria function of Mach number, for a given aircraft weight, aircraft configuration and a constant altitude.

For simulating the cruise phase of a flight, the speed and altitude profiles to fly must be determined all through this phase. Time and fuel consumption being closely related, choosing the right flight level and speed during cruise planning allows to minimize the Direct Operating Costs (DOC) of a flight. Optimization is done using a criteria called the specific range (SR). Expressed in NM/kg or NM/ton, it is the distance covered per fuel unit. This criteria depends on aerodynamic characteristics, engine performance, aircraft weight of the considered aircraft model as well as sound velocity at sea level, and evolves all through the flight. FIG. 4 illustrates the evolution of the SR criteria function of Mach number, for a given aircraft weight, aircraft configuration and a constant altitude.

As illustrated in FIG. 4, at any given weight and altitude, a maximum specific range value exists, and the corresponding Mach number is called Maximum Range Mach number ($M_{MR}$). This is the Mach number for which the fuel consumption for a given distance is at its minimum. It is therefore the maximum distance an aircraft can fly with a given fuel quantity. An alternative to $M_{MR}$ is to increase slightly fuel consumption by a significant increase in cruise speed, allowing to get to the destination airport faster. The Long-range Cruise Mach number ($M_{LRC}$) provides that possibility: at this Mach the specific range corresponds to 99% of the maximum specific range.

An aircraft operator can decide to fly at either the $M_{MR}$, $M_{LRC}$, or even at an Economic Mach number ($M_{ECON}$), the latter taking into account all costs composing the DOC of a specific flight: fixed, flight-time related and fuel-consumption related costs. $M_{ECON}$ allows therefore to fly while keeping the DOC to a minimum.

Figure 5:
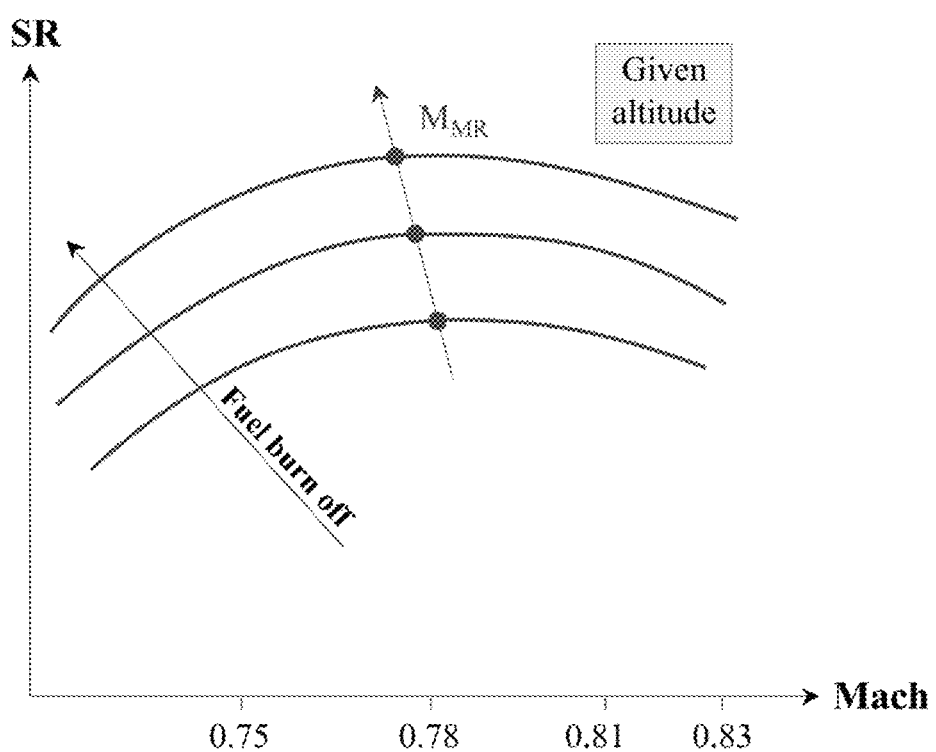
FIG. 5 is a graph illustrating the SR function of Mach for different weights of a given aircraft, at a given altitude.

During cruise, an aircraft's weight decreases as it burns off fuel. The effect of this weight loss is illustrated in FIG. 5 which plots the SR function of Mach for different weights of a given aircraft, at a given altitude. As can be appreciated, the maximum SR value increases but the $M_{MR}$ decreases.

Whatever the Mach optimization scheme an aircraft operator decides to follow, the optimum Mach number, as shown, would change all through the flight as the weight changes. The aircraft operator might even choose to follow a constant Mach number during the entire cruise phase of a flight. In that case, as the aircraft weight changes, the gap between the selected Mach and whichever optimum Mach evolves too.

Figure 6:
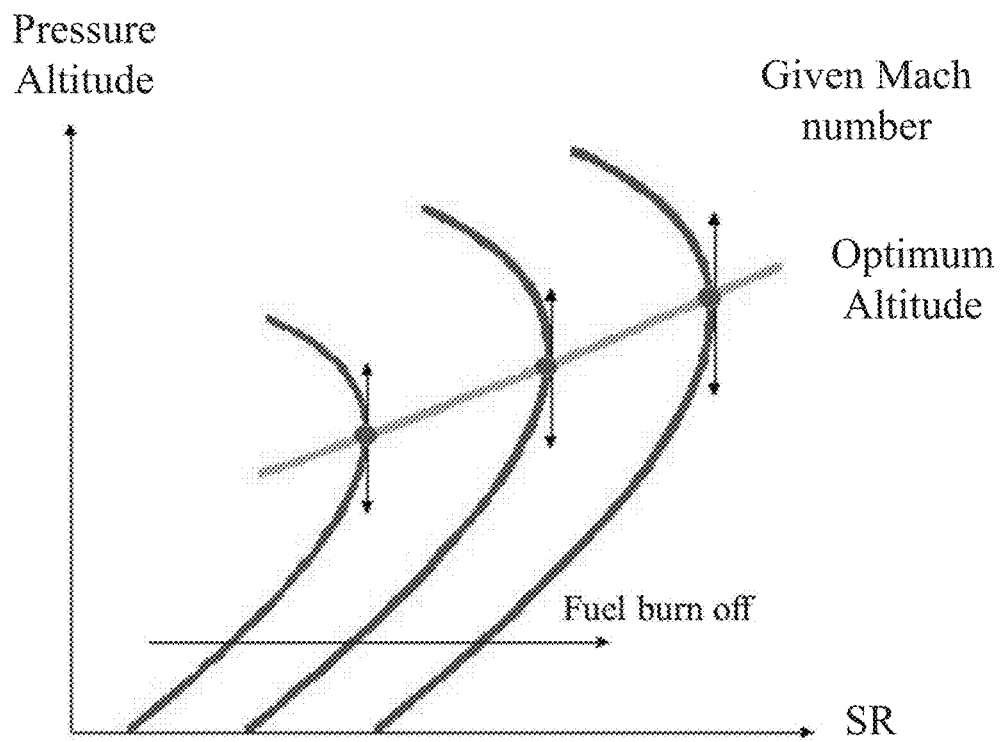
FIG. 6 is a graph illustrating for a given Mach number, the impact of Pressure Altitude (PA) on the SR curve and the evolution of the maximum SR value and the corresponding PA for a given aircraft, as it burns off fuel and loses weight.

Cruise planning also involves optimizing the flown flight levels of a flight. This is also done using the SR criteria. FIG. 6 illustrates, for a given Mach number, the impact of Pressure Altitude (PA) on the SR curve and the evolution of the maximum SR value and the corresponding PA for a given aircraft, as it burns off fuel and loses weight. PA is the altitude in the ISA with the same atmospheric pressure as that of the part of the atmosphere in question.

Figure 7:
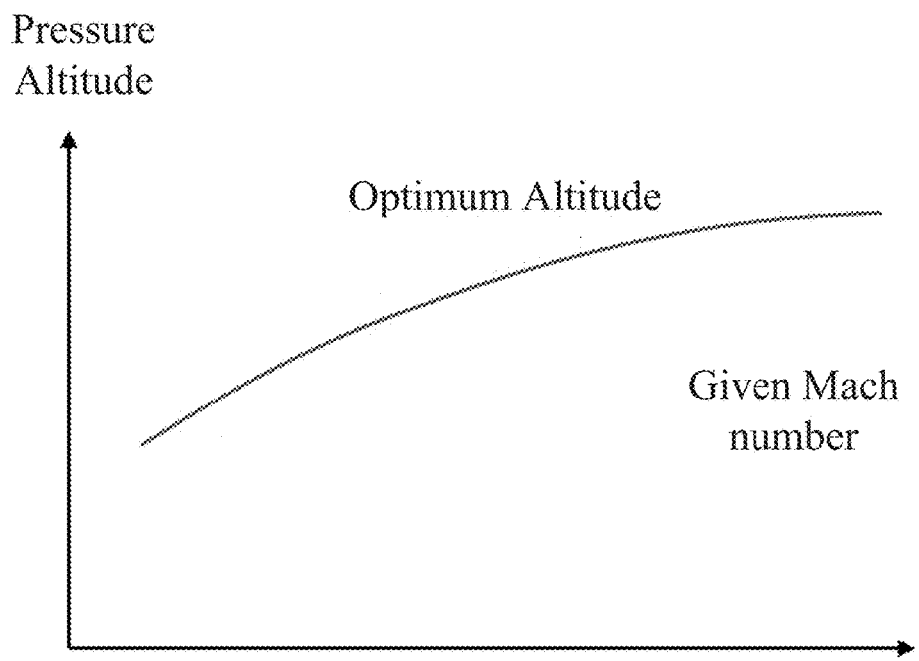
FIG. 7 is a graph illustrating that for a given weight, there exists an altitude where SR is at a maximum which is the fuel optimum altitude, and which increases continuously during flight as the aircraft's weight decreases.

Thus, for a given weight, there exists an altitude where SR is at a maximum. This is the altitude that minimizes the aircraft's fuel consumption. This fuel optimum altitude increases continuously in flight as the aircraft's weight decreases. This evolution is illustrated in FIG. 7.

Figure 8:
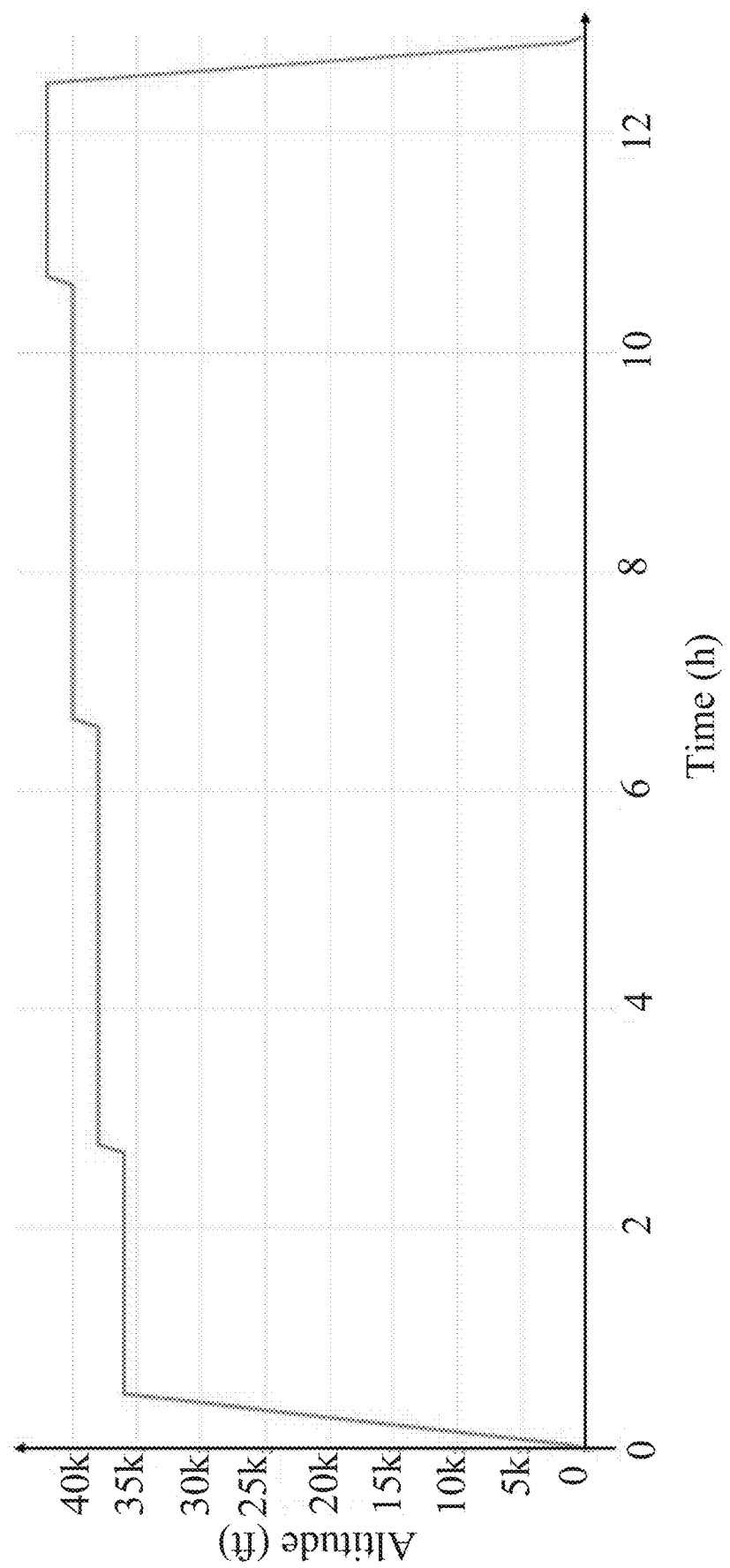
FIG. 8 is a graph illustrating an altitude profile of an aircraft flying at its optimum flight level altitudes.

For ensuring a safe and organized air traffic, an aircraft cannot follow perfectly its continuously evolving optimum altitude throughout a flight, but rather fly at standard Flight Levels, performing step climbs to get from one to another. The aircraft has to try flying at flight levels as close as possible to its optimum altitude. The altitude profile of an aircraft using standard flight levels (i.e. altitudes) over a flight duration is illustrated in FIG. 8.

Planning the cruise phase of a flight demands a continuous and iterative analysis of the SR value over the available range of Mach numbers and Flight levels to look for the desired optimum. That is why the calculation is done iteratively in the simulation process, on sectors of flight of a few minutes (1 to 5 min) Having it recalculated consecutively on short sectors allows for altitude and speed to be optimized when needed and the mass of the aircraft to be updated all through the cruise phase, and all through the flight, by subtracting the burnt fuel mass using data given by the performance models. The process is able to obtain a table of the aircraft weight all through the flight, function of the distance traveled and time of flight since takeoff. This table also contains the optimized altitude and speed at every calculated point.

An exemplary with the tabulated calculated data is depicted below in TABLE 1.

TABLE 1

| | Distance (Nm) | Time (h) | Altitude (ft) | Mach | Mass (kg) |
|---|---|---|---|---|---|
| Departure airport | 0 | 0 | 0 | 0 | 235000 |
| ... | ... | ... | ... | ... | ... |
| 23 | 227.072 | 0.5460 | 38000 | 0.84 | 230000 |
| 24 | 235.102 | 0.5627 | 38000 | 0.84 | 229903 |
| 25 | 243.132 | 0.5793 | 38000 | 0.84 | 229807 |
| 26 | 251.162 | 0.5960 | 38000 | 0.84 | 229710 |
| 27 | 259.192 | 0.6127 | 38000 | 0.84 | 229613 |
| 28 | 267.222 | 0.6293 | 38000 | 0.84 | 229517 |
| 29 | 275.252 | 0.6460 | 38000 | 0.84 | 229420 |
| 30 | 283.282 | 0.6627 | 38000 | 0.84 | 229323 |
| 31 | 291.312 | 0.6793 | 38000 | 0.84 | 229227 |
| ... | ... | ... | ... | ... | ... |
| Destination airport | 4000.000 | 9.0000 | 0 | 0 | 195000 |

In the above TABLE 1, the numbers in the first column represent calculation points in the flight simulation process.

Returning to FIG. 3, the fine filtering step 110 also includes a step 204 of determining the weight of the follower aircraft throughout its unchanged initial flight plan. This step 204 may follow the exact same procedure as for the leader aircraft to tabulate the evolution of the follower aircraft's mass, Mach value and altitude throughout its unchanged initial flight plan (not including any formation section) function of the distance traveled and time of flight since takeoff. This will be needed for determining the reference trip fuel consumption, and later on the fuel savings achievable with formation flight, discussed below.

In the next step 206, the fine filtering 110 determines new flight plans and the weights of both the leader and follower aircraft along these new flight plans.

In this step 206, the previous process of simulating the different phases of both leader and follower aircraft is repeated. The difference in this step 206 is that the process needs to simulate getting the pair in a position such as the follower aircraft is within a, for instance, 3 NM distance behind the leader aircraft. This formation position is to be acquired as close as possible to the previously described merge point. Moreover, the process needs to take into account in the simulation the effect of flying in the upwash region of the trailing vortices of the leader aircraft for the rest of the common section.

For the pair of aircraft to close the gap and place themselves in the required relative positioning, the one in front can fall back as the one behind speeds up to catch up if they are at cruising altitude. They could also perform faster or slower initial climbs after takeoff if needed.

Once the follower is within the 3 NM distance behind the leader aircraft, they have to synchronize their speed and altitude, and fly a planned synchronized speed and altitude profile for the rest of the common section until reaching the split point. Between the point where the pair gets into formation position and the split point, the process needs to carry on simulating both flights while taking into account the benefit of flying in the wake upwash region for the follower aircraft.

As explained previously, the formation flight is performed over a part of the cruise phases of both flights. As for the cruise phase of an aircraft flying on its own, one has to decide on the speeds and altitudes for the pair to fly at in a fuel saving formation. Cruise planning has to be done for both aircraft together, in a way to optimize their common flight section, as it is needed that they fly at a synchronized altitude and speed at any point of this common section.

Figure 9:
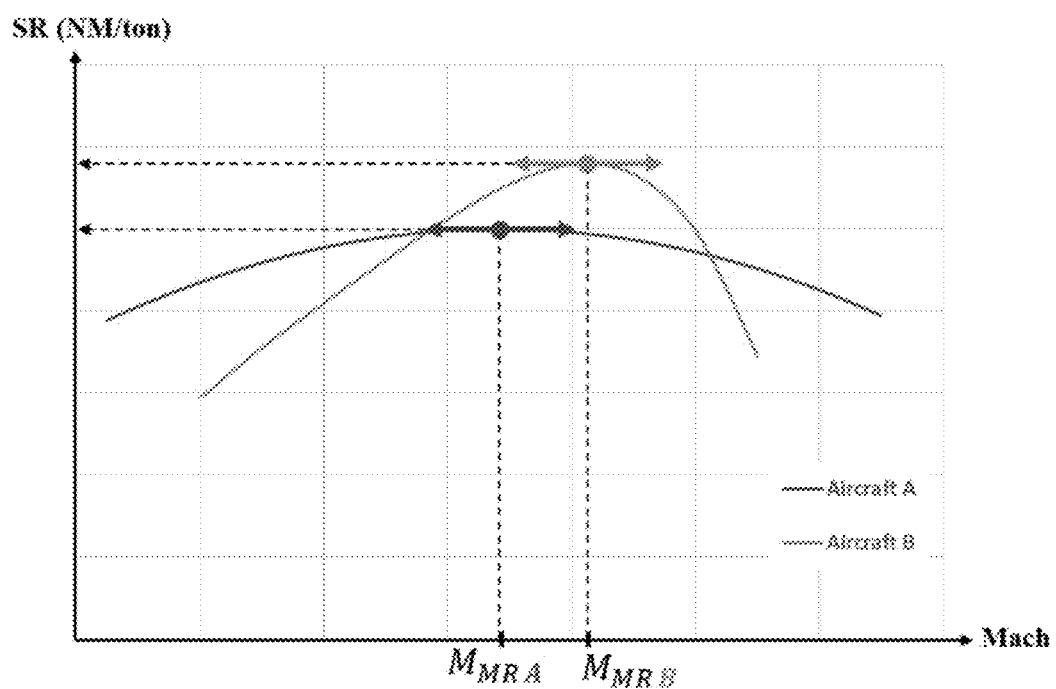
FIG. 9 is a graph illustrating the SR function of Mach number for two aircraft of different weight and/or aircraft types.
Figure 10:
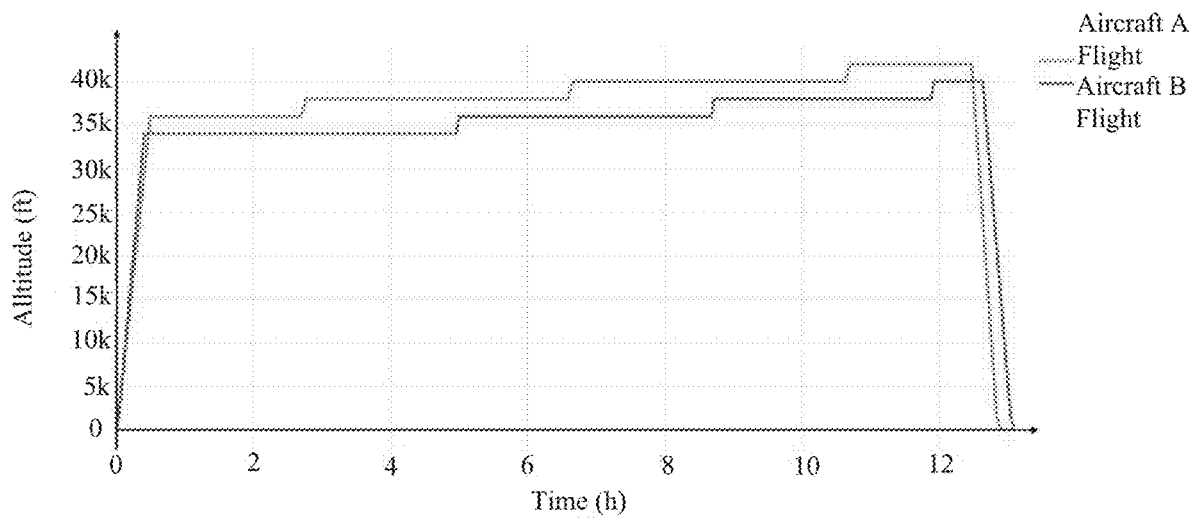
FIG. 10 is a graph illustrating the altitude profiles of two aircraft of different weight and/or aircraft types flying along their optimum flight level altitudes.

The complexity of planning the cruise phase of the pair is in finding the balance between their respective SR curves. In fact, SR curves are different for every aircraft type, and even for different weights of a same aircraft type. This principle is illustrated in FIG. 9 where are plotted the SR curves of two aircraft at a given altitude and weight each, function of Mach number. The difference in $M_{MR}$ numbers goes to show that any two aircraft of a given pair will have different optimums. This results in two distinct altitude profiles for their respective optimized flight, as illustrated FIG. 10.

A way to perform cruise planning for a pair of aircraft that needs to fly together is to generate a new optimization criteria, i.e., a common global SR. For a given altitude and Mach number, one could determine a theoretical specific range criteria of a pair of two aircraft, not in a fuel saving formation, $SR_{A+B}$, from their respective specific ranges $SR_A$ and $SR_B$, for given respective weights:

$$SR_{A+B} = \frac{1}{\frac{1}{SR_A} + \frac{1}{SR_B}}. \quad \text{[Equation 1]}$$

But for a pair of aircraft that needs to fly together in formation, the process also needs to take into account the impact on the follower aircraft's fuel consumption of flying in the upwash region of a wake vortex.

One way to do that is by intervening on the FC fuel consumption data given by the original performance models for the aircraft (not in formation) at any given instant (given weight, configuration, speed, altitude, ISA conditions, ... ), i.e. by determining the associated ΔFC fuel consumption reduction term calculated by multiplying four quantities such that:

$$\Delta FC = kADJ \cdot kFC \cdot kWD \cdot kWS \cdot FWV(\Delta Y) \quad \text{[Equation 2]}.$$

In Equation 2, FWV(ΔY) represents the aerodynamic benefits determined from the aerodynamic influence of the wake vortices integrated over the wingspan of the follower aircraft. The primary input variable for this term is the lateral separation from the wake vortices ΔY. The wake vortex spacing and vortex core radius are parameters for a model for the radial velocity of the vortices, which varies with the distance from the vortex cores. The separation from the wake, ΔY, positions the follower aircraft relative to the wake vortices at the same altitude. The influence of the wake is then related to a distribution of upwash on the wing, which may be used to determine an approximate lift increase through a weighting function determined from the wing loading.

Additionally, kWS from Equation 2 represents the initial wake circulation strength calculated from the estimated mass and speed of the leading aircraft, the local gravitational acceleration, the air density at the current altitude and temperature, and the true airspeed of the leader.

In Equation 2, kWD represents an estimate of the fraction of the wake strength decay based on the age of the vortex, which is determined from the speed of the following aircraft and the relative distance between the leader and follower while in formation.

Further, kFC from Equation 2 represents a coefficient needed to obtain the predicted reduction in fuel consumption from the combined aerodynamic performance improvements obtained from multiplying terms 1 through 3. This term uses the following parameters known or estimated for the follower aircraft: specific range, specific fuel consumption, true airspeed and mass.

Additionally, kADJ from Equation 2 represents used to correct the predicted reduction in fuel consumption based on data obtained from previous flights for the same or similar aircraft type in a fuel saving formation. This adjustment may be improved over time as more data is available from actual flights.

This allows the process to include the relative fuel consumption reduction $$\frac{\Delta FC}{FC}$$

in an updated follower aircraft SR criterion. As would be appreciated, the terms are calculated at a specific time as they depend on many factors, such as speed, altitude, weight, aircraft model, ISA conditions, etc. If aircraft B is considered as the follower aircraft, a follower specific range $SR_{follower}$ (placed in a fuel savings formation) would be expressed as such:

$$SR_{follower} = \frac{SR_B}{\left(1 + \frac{\Delta FC}{FC}\right)}.$$ [Equation 3]

A follower aircraft saving fuel would have a negative $\Delta FC$. Thus, resulting in:

$$SR_{follower} > SR_B$$ [Equation 4].

Finally, for getting the common SR of a pair flying in formation, the previously defined, in Equation 1, specific range of a pair flying together $SR_{A+B}$ needs to be adapted by replacing the specific range of the designated follower aircraft, by this follower specific range expression, $SR_{follower}$, defined in Equation 3. Assuming aircraft A is the leader and aircraft B the follower of the formation, the new optimization criteria is as follows:

$$SR_{formation} = \frac{1}{\frac{1}{SR_A} + \frac{\left(1 + \frac{\Delta FC}{FC}\right)}{SR_B}}.$$ [Equation 5]

Figure 11:
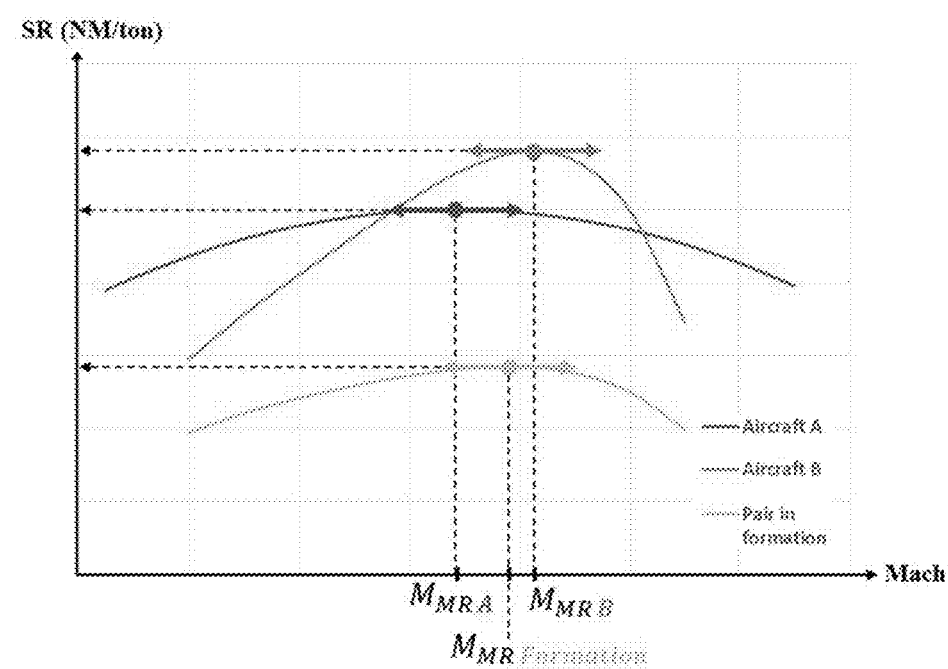
FIG. 11 is a graph illustrating the SR function of Mach number for two aircraft of different weight and/or aircraft types and the resulting SR of the two forming a fuel saving formation.

Having this criteria, for a given altitude and given weights for each of the two aircraft, the $SR_{formation}$ curve function of Mach number can be plotted, providing different optimization points for the pair in formation than for each of the two aircraft separately. FIG. 11 illustrates this, with the different SR curves plotted and the different Maximum Range Mach number optimums ($M_{MR}$) pointed out for each of them.

With this criteria available, it can be determined to apply whichever optimization scheme is desired for the formation flight planning: $M_{MR}$, $M_{LRC}$, $M_{ECON}$, etc.

Figure 12:
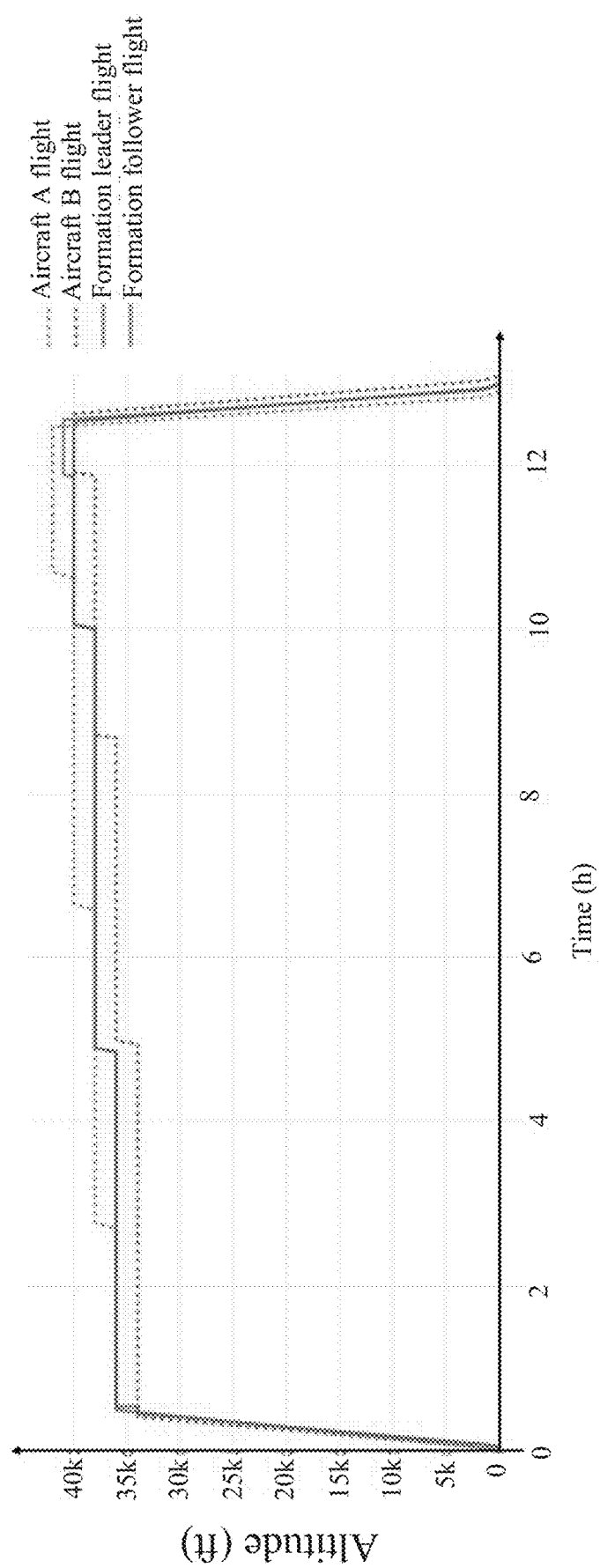
FIG. 12 is a graph illustrating the distinct altitude profiles of two aircraft of different weight and/or aircraft types flying along their optimum flight level altitudes and the resulting optimum altitude profiles when flying in a fuel saving formation.

FIG. 12 illustrates how the originally distinct altitude profiles are altered using the described $SR_{formation}$ criteria, to make the leader and follower aircraft fly together their optimal flight levels as a pair performing a formation flight.

The same is done with the Mach number profiles.

As for the cruise phase of an aircraft flying on its own, planning the cruise phase of a pair in a fuel saving formation demands a continuous and iterative analysis of the $SR_{formation}$ value over the available range of Mach numbers and Flight levels of both aircraft, to look for the desired optimum. That is why the calculation is done iteratively in the simulation process, on sectors of flight of a few minutes (1 to 5 min) Having it recalculated consecutively on short sectors allows for optimizing the pair's altitude and speed when needed and updating the masses of the aircraft all through the formation flight sector by subtracting the burnt fuel masses using data given by the performance models. For the follower aircraft, the simulation intervenes over the formation flight section on the FC fuel consumption data given by the original performance models by adding the associated $\Delta FC$ fuel consumption reduction term described previously.

Once the aircraft have reached the split point 24, the step 206 simulates what is left of their respective flight from that point, thus using their resulting new masses at that point, each to their respective destination airport, using their respective original performance models. Accordingly, the step 206 needs to simulate what is left of the cruise sectors, the descent phases, possible holdings and finally the final approaches and landing phases, calculating the mass evolution at every step.

In any case, as the leader and follower aircraft's fuel burns are modified all through the formation flight sector compared to their initial unchanged flights simulated in steps 202 and 204, their weights also evolve differently. Therefore, the aircraft have different weights at arrival than in those original flights.

Finally, the fine filtering step 110 also includes a step 208 of comparing the trip fuel consumption flying the new flight plans with that of flying the initial flight plans.

Accordingly, the process calculates for the follower aircraft a difference as: [mass at landing—the takeoff mass with the flight plan including a formation flight] minus [mass at landing—the takeoff mass for the initial unchanged flight plan not including a formation flight]. For the leader aircraft, the process determines a difference as: [mass at landing—the takeoff mass with the flight plan including a formation flight] minus [mass at landing—the takeoff mass for the initial unchanged flight plan not including a formation flight]. Adding together the two obtained values provides the net trip fuel savings, i.e., the trip fuel savings for the pair of aircraft. When there is a gain for the net trip fuel savings, the pair is selected as a pair of interest 112 (FIG. 2), otherwise it is rejected.

Accessible altitudes and speeds at any point in flight, regarding performance capabilities, depend on the aircraft model, weight, configuration and ISA conditions. The flyable domain of speeds and altitudes is called the Speed Envelope of an aircraft. Various phenomena draw the limits of this speed envelope such as buffet, air compressibility effect, structural flutter, structural loads, stall and engine capabilities. These constraints of speed and/or altitude may be a second criteria 114 used in the fine filtering step 110. They apply to every step of a flight and should be verified continuously when simulating a flight of any aircraft. Thus, the second criteria 114 may be verified continuously not only in steps 202 and 204, but also continuously in step 206. This second criteria may be particularly constraining when the process simulates the follower and leader aircraft closing the gap between them in order to place themselves in the required, for instance, 3 NM position follower aircraft 16 behind the leader aircraft 14, and then from that point of the flight and for the rest of the common ground section 26, when the follower and the leader aircraft attempt to adapt their speed and altitude to fly a synchronized optimized speed and altitude profile. Due to Speed Envelope constraints, a leader and follower aircraft might not be able to close the gap between them and get into a fuel saving formation. When this is the case, the pair is not selected as a pair of interest 112.

At the end of the process 100, if there are one or several possible pairs of interest 112 for a given flight, the process 100 includes a step 116 of providing the new flight plan options for that flight with the respective calculated fuel burn savings to the airlines or other appropriate authority. This step 116 may allow the airline to select 118, via a man-machine interface, a pair of interest and to update 120 the flight plan of the follower aircraft in the database 102. Alternatively, if presented with one or several pairs of interest, the process 100 may automatically select 118 the combination of pairs of interest 112 that offers the highest accumulated net trip fuel savings possible, while satisfying aircraft operators' preselected preferences and Air Traffic Control (ATC) constraints that have been indicated or provided. The flight plan is updated with the airline and presented for validation to the authorities (including ATC).

As explained above, the foregoing embodiment of the present process 100, the waypoints of the flight plans for the aircraft 14, 16 were not adjusted—only the time to reach these waypoints, altitudes, and speeds are changed. However, in another embodiment, the present process 100' includes modifying the initial flight plan of the follower aircraft with new waypoints to go through during its flight, while the waypoints of the leader aircraft are kept the same.

Accordingly, for this embodiment, for each possible pair of flights, the process 100 (will) modify the flight plans of both follower and leader aircraft by simulating earlier merge points and later spilt points along the leader aircraft's route 10, so as to have a common route section 26 longer than the one found in the original flight plans. The process will analyze whether flying in a cooperative fuel saving formation on the extended common section allows to generate net trip fuel burn savings for the pair compared to flying their initial flight plans. If there is a benefit, it is considered to be a pair of interest 112. Accordingly, the speed and altitude profile of both follower and leader aircraft is also modified compared to their initial flight.

Referring to FIG. 2, in this embodiment of the present invention, the process 100' includes a coarse filtering step 104 based on the large number of aircraft referenced in the database 102. Again, in the coarse filtering step 104 the operational feasibility of each candidate pair is evaluated against first criteria 108'. If the pair meets the criteria 108', the process 100' proceeds further with evaluation of the possible pair 106.

According to this embodiment, the first criteria 108' may include:

during a certain time period both aircraft of a potential pair must be airborne;

general direction (example: from south to north, from east to west) which is similar/identical for the two planes of a possible pair;

maximum allowable added travel distance of 700 NM: for a candidate pair of aircraft composed of the follower and a leader, this is the maximum extra travel distance that can be imposed (between the beginning and the end of the follower aircraft's flight) upon the follower aircraft with respect to its initial route so that the latter is positioned in a situation of formation flight engagement, i.e. under a distance of, for instance, 3 NM behind the leader (the maximum added travel distance corresponds to the maximum distances that would have to be traveled to cancel the maximum gain of the possible pairs); and, the two aircraft must not be flying further than, for instance, 300 NM (included in the 700 NM limit mentioned above) apart at the beginning of their overlapping route section, before applying any catching up strategy, whether their route's merge point is resulting from their original flight plans or the modified one.

As an example of the added travel distance limit, a first aircraft following a second aircraft on a very long-haul flight can generate up to 8 tons of fuel gain. Using an average fuel consumption value, it is estimated that it would take a little less than 700 NM in solo flight for the first aircraft to consume 8 t of fuel. Thus, a detour of more than 700 NM cannot be imposed to the follower aircraft to join the formation.

Additionally, it should be noted that in this embodiment, the first criteria 108' may not necessarily include or require that the pair initially has a common ground section.

As shown in FIG. 2, if the pair meets the criteria 108', the process 100' proceeds with evaluation of the possible pair 106 in the fine filtering step 110'. In the fine filtering step 110', all phases of a flight for both leader and follower aircraft from their respective departure to arrival airports are simulated. Again, the phases are: taxi, takeoff, climb, cruise, descent, possible holding, final approach and landing. By using each of the aircraft's associated flight performance and fuel consumption models and data, the weights of the two aircraft throughout their respective flight are determined.

Figure 13:
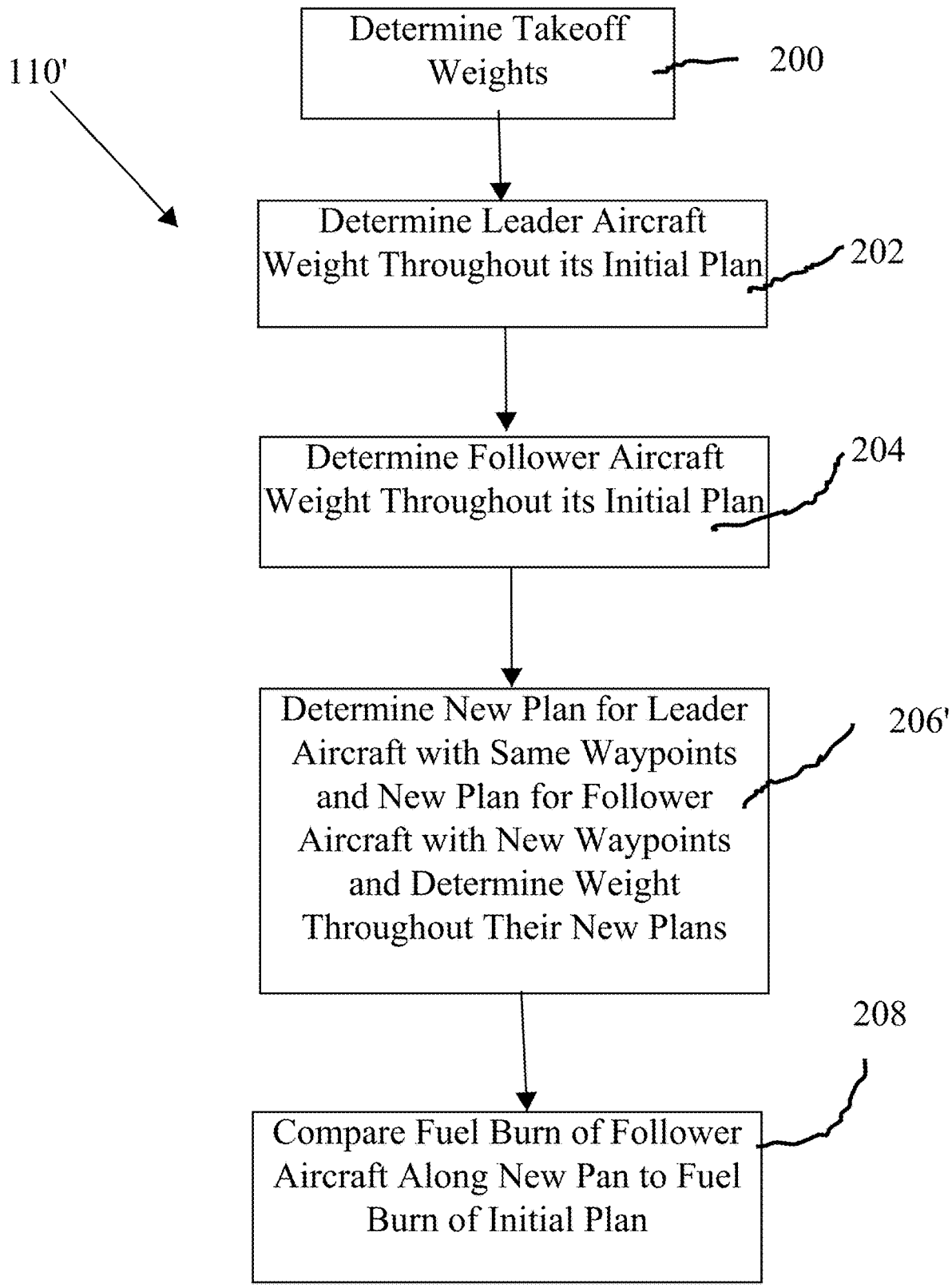
FIG. 13 is a process flow diagram of an aspect of the processes according to the present invention; and, FIG. 14 is another process flow diagram of an aspect of the processes according to the present invention.

Turning to FIG. 13, the fine filtering step 110' of the present embodiment includes the same initial steps 200, 202, and 204 discussed above with respect to FIG. 3. However, in this embodiment the fine filtering step 110' includes a step 206' of determining new flight plans for both the leader and follower aircraft where one or both of the merge and split points of the pair 106 is modified (or created when nonexistent), and determining the respective weights of the leader and follower aircraft all through their new flight plans.

According to the present embodiment 100', in this step 206', for identifying a new merge and/or split waypoint, the fine filtering step 110' utilizes the waypoints on the leader aircraft's route outside of the initially identified, if existing, common route section 26: the optimal waypoints are the ones that allow to maximize the net trip fuel savings of the pair. There are, in the literature, plenty of optimal plan searching algorithms and techniques with various performance and complexity. For example, one way exploited in step 206' to determine the new merge and/or split waypoint is by using average fuel consumption rates determined from the simulated flights following the unchanged initial flight plan, and an average formation flight potential fuel consumption reduction value. Using average values enables the fine filtering step 110' to process faster the large quantity of possible follower-leader pairs 106 to test, by making the calculations easier and faster.

In order to orient the search and reduce the number of potential waypoints to evaluate when searching for the new merge waypoint, one way the step 206' uses a heuristic technique, for example, is by applying the above mentioned average fuel consumption values to great circle distances between the follower aircraft (either from its departure airport or a desired point in flight) and potential merge waypoints, and the average fuel consumption with the formation flight reduction to the consequently added segment of common route. Then for each of the potential merge waypoints left, the step 206' calculates the shortest path (ground distance or Equivalent Still Air Distance) through available airways and waypoints, linking his original route to the tested merge waypoint. It then applies the average fuel consumption values to the calculated new route and added segment of common route (flown in formation), in order to determine the fuel cost of each considered merge waypoint. It then compares the results: the new merge waypoint is identified as the one allowing the lowest fuel consumption for the follower aircraft.

The same process applies when searching for the optimal split point. The step 206' first uses a heuristic technique to orient the search and reduce the number of potential split waypoints by applying average fuel consumption values with formation flight reduction to the added segment of common route, and average values without the fuel consumption reduction for the aircraft flying alone to the great circle distances between the considered split waypoints and the follower aircraft's destination airport. It then identifies the shortest paths, through available airways and waypoints, linking the remaining potential split waypoints to the destination airport and applies the average fuel consumption values to them. The new split waypoint is identified as the one allowing the lowest fuel consumption for the follower aircraft.

The new route should satisfy air traffic constraints and airline preferences. The result gives at least one possible route for the follower aircraft. Of course, the optimized merge and/or split waypoints can happen to be the original merge and/or split waypoints, before altering the original flight plans.

Once the new route is determined, the step 206' determines the weights of both the follower and the leader aircraft along their respective new flight plan. Again this is determined following the process explained above by: simulating the different phases of the flights; simulating closing the gap between the pair to get the follower in the, for instance, 3 NM distance behind the leader; optimizing the pair's common altitude and speed profile by analyzing the $SR_{formation}$ criteria for the section between the point where the pair is in formation position (follower under 3 NM behind the leader) and the (possibly new) split point; updating the masses of both aircraft all through the formation flight segment in the iterative calculation of sectors of a few minutes (1 to 5 min) by subtracting the burnt fuel data given by the performance models, the simulation applying the associated fuel consumption reduction term $\Delta FC$ for the follower aircraft over the formation flight segment; and, simulating what is left of the pair's respective flight after the split of the formation, each to their destination airport, using the original performance models.

Accordingly, in step 206' the trip fuel consumption of both the leader and follower aircraft flying the new flight plans with the new merge and/or split waypoint and a formation flight section are determined. As for the foregoing embodiment, these are compared, in step 208, to the trip fuel consumptions obtained for the initial unchanged flight plan simulations in order to get the net trip fuel savings of the given pair. Returning to FIG. 2, if there is a net saving of fuel, the pair is selected as a pair of interest 112, otherwise it is rejected. As explained above, speed envelope constraints (as second criteria 114) must be verified continuously during the fine filtering 110' as they might make closing the gap between the leader and the follower impossible, or constrain the optimization of the speed and altitude profile for the pair while in the fuel saving formation on the common ground section 26.

It is contemplated that the fine filtering 110' also includes a step of optimizing of the new route of the follower aircraft when having used average fuel consumption values is step 206', by testing surrounding waypoints on the leader aircraft's route as new merge/split waypoints: steps 206' and 208 are repeated while using the actual performance models this time on the identified respective shortest path (ground distance or Equivalent Still Air Distance) and optimizing the added formation sector using the $SR_{formation}$ criteria. This allows a finer determination of the fuel cost of each of these route modifications compared to when fuel consumption averages where used above. Comparing the different results provides the optimal merge and/or split waypoint, generating the highest net trip fuel savings. Completing this when a pair is identified as a pair of interest 112 enables the process to run faster by completing it on fewer number of pairs, but it is contemplated that this step can be completed for every pair 106 before evaluating in step 208 if a pair in question is a pair of interest.

The remaining portions of this process 100' are the same as described above.

This embodiment makes it possible to optimize the follower aircraft's route as to have a common section which increases or even maximizes the net trip fuel savings by a redefinition of the merge waypoint and/or split waypoint on the leader's route, in the case where the leader and follower have a common route section in their original unchanged flight plans, or by calculating a new route for the follower aircraft with a merge waypoint, common section, and a split waypoint in the case where leader and follower do not have overlapping routes in their initial flight plans, thus with no section in common.

According to this embodiment, it is contemplated that only the split waypoint is modified. The follower aircraft saves fuel by flying in a cooperative formation (the pair's common speed and altitude profile is optimized using the $SR_{formation}$ criteria) with the leader aircraft over the common section identified in their original flight plan. Instead of splitting from the leader at the original split waypoint, the follower aircraft follows the leader on his route still flying in formation and saving fuel. Once they get to the previously determined new split waypoint, the formation breaks and the follower flies to its destination airport.

Alternatively, only the merge waypoint or both the merge waypoint and split waypoint may be modified. Thus, the follower aircraft takes off and leaves its originally planned route to merge with the leader aircraft at the modified merge waypoint. Modifying the merge waypoint opens the possibilities of pairs of interest to pairs of aircraft not having overlapping routes in their original flight plans. The pair flies in a cooperative formation (the pair's common speed and altitude profile is optimized using the $SR_{formation}$ criteria) until they reach the modified split waypoint where the formation breaks, and the follower aircraft flies to its destination airport. Not only does this embodiment allow the process to maximize net trip fuel savings and enable formation flight between pairs not having overlapping routes in their original flight plans, but it could also help in closing the gap between leader and follower aircraft and get the latter into a fuel saving position in an easier and less fuel consuming way.

In yet another embodiment of the invention, the process 100" includes modifying the initial flight plans for both aircraft 14, 16 with new waypoints. Thus, for each possible pair of flights, the process 100" will determine new waypoints by testing earlier merge points and later spilt points, so as to have a common route section 26 longer than the one found in the original flight plans and thus modify the flight plans. The process 100" analyzes whether flying in a cooperative fuel saving formation on the extended common section allows to generate net trip fuel burn savings for the pair compared to flying their initial flight plans. If there is a benefit, it is considered to be a pair of interest 112. The pair's speed and altitude profiles may also be modified compared to their initial flight plans.

Referring again to FIG. 2, in this embodiment of the present invention, the process 100" includes the same coarse filtering step 104 discussed above. If a pair of aircraft from the database 102 meets the first criteria 108', the process 100" proceeds to evaluate the possible pair 106 in the fine filtering step 110".

It should be noted that in this embodiment as well, the first criteria 108' may not necessarily include or require that the pair initially has a common ground section.

As in the case of the above embodiments, in this embodiment, the fine filtering step 110" simulate all phases of a flight for both leader and follower aircraft from their respective departure to arrival airport. Again, the phases are: taxi, takeoff, climb, cruise, descent, possible holding, final approach and landing. By using the two aircraft's associated flight performance and fuel consumption models and data, the process may determine the two aircraft's weights throughout their respective flight.

Figure 14:
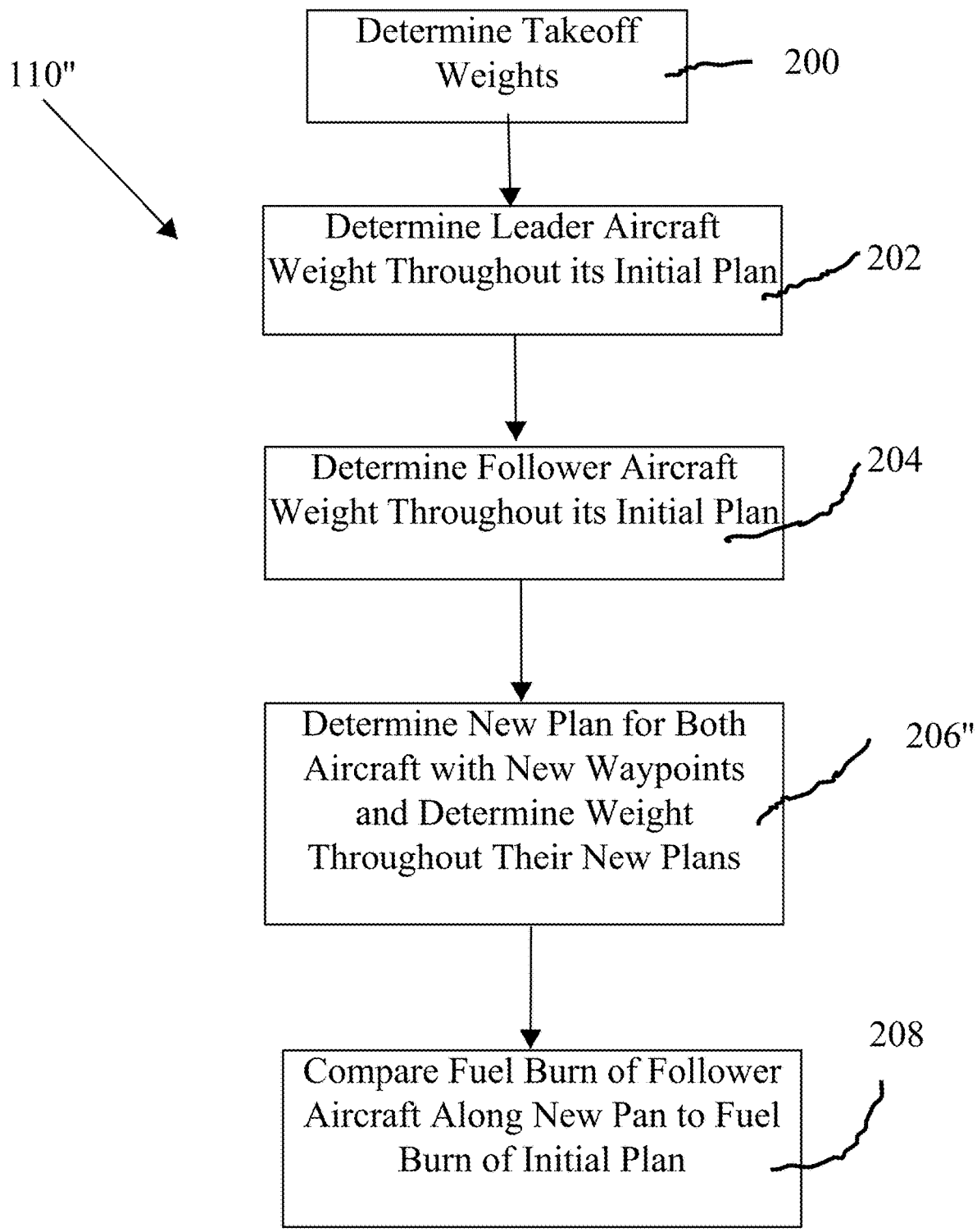

Turning to FIG. 14, the fine filtering step 110" of the present embodiment includes the same initial steps 200, 202, and 204 discussed above with respect to FIGS. 3 and 13. However, in this embodiment the fine filtering step 110" includes a step 206" of determining new flight plans for both the leader and follower aircraft where one or both of the merge and split points of the pair 106 is modified (or created when non-existent), and determining the respective weights of the leader and follower aircraft all through their new flight plans.

For determining a new merge waypoint of a considered pair of flights, the step 206" considers the waypoints located in the area defined by a polygon that has the following borders: the leader and follower's routes from their respective departure airport to the original merge waypoint originating from their unchanged initial flight plans, as well as the shortest path linking the two departure airports. For determining a new split waypoint of a considered pair of flights, the process considers the waypoints located in the area defined by a polygon that has the following borders: the leader and follower's routes from the original split waypoint originating from their unchanged initial flight plans to their respective destination airport, as well as the shortest path linking the two destination airports. In the case where the initial flight plans do not include a common ground section, the process considers the waypoints located in the area defined by a polygon that has the following borders: the leader and follower aircraft routes from their initial flight plans, the shortest path linking the two departure airports, as well as the shortest path linking the two destination airports. The new merge and/or split waypoints are the ones that allow to maximize the net trip fuel savings for the follower and leader aircraft pair.

There exists many optimal path searching algorithms and techniques with various performance and complexity. One way exploited in step 206" to determine the new merge and/or split waypoint is by using average fuel consumption rates determined from the simulated flights following the unchanged initial flight plan, and an average formation flight potential fuel consumption reduction value. Using average values allows the fine filtering step 110" to process faster the large quantity of possible follower-leader pairs 106 to test, by making the calculations easier and faster.

In order to orient the search and reduce the number of potential waypoints to evaluate when searching for the new merge waypoint, one way the step 206" uses a heuristic technique, for example, is by applying the above mentioned average fuel consumption values to great circle distances between, for each aircraft of the pair, either its departure airport or a desired point in flight, and the potential merge waypoints, then to the great circle distances between the latter and the original merge waypoint originating from the unchanged initial flight plans. In the case of the follower aircraft, the process takes into account the formation flight fuel consumption reduction average value over the consequently added segment of common route.

Then for each of the potential merge waypoints left, the step 206" calculates the shortest path (ground distance or Equivalent Still Air Distance) through available airways and waypoints, linking the original routes to the tested merge waypoint. It then applies the average fuel consumption values to the calculated new routes and added segment of common route (flown in formation), in order to determine the fuel cost of each considered merge waypoint. It then compares the results: the new merge waypoint is identified as the one allowing the lowest fuel consumption for the pair of aircraft.

The same determination applies when searching for the optimal split point. The step 206" first uses a heuristic technique to orient the search and reduce the number of potential split waypoints by applying average fuel consumption values for both aircraft, with the formation flight reduction average value for the considered follower aircraft, to the added segment of common route, and average fuel consumption values to the great circle distances between the considered split waypoints and their respective destination airport. It then identifies the shortest plans, through available airways and waypoints, linking the remaining potential split waypoints to the destination airports and applies the average fuel consumption values to them. The new split waypoint is identified as the one allowing the lowest fuel consumption for the pair of aircraft. In the case where the initial flight plans do not include a common ground section, the step 206" applies the described process by looking for both the new merge and split waypoint simultaneously with a heuristic technique to get a first hypothesis of the positions of both the merge and split points before proceeding with the shortest path searching described above.

The new route should satisfy air traffic constraints and airline preferences. The result gives at least one possible combination of routes for the leader and follower aircraft. Of course, the optimized merge and split waypoints may turn out to be the initial merge and split waypoints, before altering the original flight plans.

Once the new route is determined, the step 206" determines the weights of both the follower and the leader aircraft along their respective new flight plan. Again this is determined following the process explained supra in the foregoing embodiments: simulating the different phases of the flights; simulating closing the gap between the pair to get the follower in the, for instance, 3 NM distance behind the leader; optimizing the pair's common altitude and speed profile by analyzing the $SR_{formation}$ criteria for the section between the point where the pair is in formation position (follower under 3 NM behind the leader) and the (possibly new) split point; updating the masses of both aircraft all through the formation flight segment in the iterative calculation of sectors of a few minutes (1 to 5 min) by subtracting the burnt fuel data given by the performance models, the simulation applying the associated fuel consumption reduction term $\Delta FC$ for the follower aircraft over the formation flight segment; and, simulating what is left of the pair's respective flights after the split of the formation, each to their destination airport, using the original performance models.

As with the foregoing embodiments, the trip fuel consumption of both the leader and follower aircraft flying the new flight plans with the new merge and/or split waypoints and a formation flight section are determined. As for the foregoing embodiment, these are compared, in step 208, to the trip fuel consumptions obtained for the initial unchanged flight plans simulations in order to get the net trip fuel savings of the given pair. Returning to FIG. 2, if there is a net saving of fuel, the pair is selected as a pair of interest 112, otherwise it is rejected. Additionally, as explained above, speed envelope constraints (as the second criteria 114) must be verified continuously in the fine filtering 110" as they might make closing the gap between the leader and the follower impossible, or constrain the optimization of the speed and altitude profile for the pair while in the fuel saving formation on the common ground section 26.

It is contemplated that the fine filtering step 110" includes optimizing the new routes of the follower and leader aircraft when having used average fuel consumption values is step 206", by testing the waypoints closely surrounding the new merge and/or split waypoints: steps 206" and 208 are repeated while using the actual performance models this time on the identified respective shortest path (ground distance or Equivalent Still Air Distance) and optimizing the added formation sector using the $SR_{formation}$ criteria. This allows a finer determination of the fuel cost of each of these route modifications compared to when fuel consumption averages are used. Comparing the different results provides the optimal merge and split waypoint, generating the highest net trip fuel savings. Again, completing this when a pair is identified as a pair of interest 112 allows the process to run faster by completing it on fewer number of pairs, but it is contemplated that this step can be completed for every pair 106 before evaluating in step 208 if a pair in question is a pair of interest.

The remaining portions of this process 100" are the same as described above.

This embodiment makes it possible to optimize both the leader and follower's routes to have a common section which increases or even maximizes the net trip fuel savings: by a redefinition of the merge waypoint and/or split waypoint, in the case where the leader and follower have a common route section in their original unchanged flight plans; or by calculating a set of new routes for both the leader and the follower aircraft with a merge waypoint, common section, and a split waypoint in the case where they do not have overlapping routes in their initial flight plans, thus with no common section.

For example: the two aircraft take off and leave their originally planned route (either as soon as they takeoff or at a different desired point in flight) to merge together at the optimized merge waypoint. The pair flies in a cooperative formation (the pair's common speed and altitude profile is optimized using the $SR_{formation}$ criteria) until they reach the optimized split waypoint where the formation breaks, and both aircraft fly to their respective destination airport. Not only does this embodiment allow net trip fuel savings to be maximized and enable formation flight between pairs not having overlapping routes in their original flight plans, but it may also aide in closing the gap between leader and follower aircraft and get the latter into the fuel saving formation position in an easier and less fuel consuming way.

When a pair of interest is performing a cooperative formation flight, both the leader and follower aircraft are subject to extra fuel consumption as they are flying the common track section at an optimum speed and altitude profile determined by analyzing $SR_{formation}$ which is different from their respectively optimized original altitude and speed profiles. The follower's potential fuel losses are overbalanced by the fuel it is saving by flying in the leader's wake. But that is not the case for the leader aircraft's potential losses. If these are too great for the leader, this might discourage the aircraft operator from performing the formation flight. An option would be to plan the formation flight by giving the advantage to the leader aircraft in terms of performance optimization. An example of how this could be done would be to add weights to the specific range criteria of each of the pair's aircraft when determining their common formation optimization criteria, $SR_{follower}$, tipping the formation's optimum points towards the leader aircraft's optimum points. Repeating the process a few times by testing a larger and larger weighting of the leader aircraft's criteria relative to the follower aircraft's weighting would allow to converge to a flight where the leader's losses satisfy the limit level of what is considered acceptable by the aircraft operator. This would of course generate a less beneficial formation flight in terms of total fuel saved for the pair.

By flying at common speed and altitude, each aircraft of the pair will most probably arrive at its respective destination airport ahead of or behind schedule compared to its original flight plan. When required, the process may compensate by having them speed up or slowdown in the simulation, after the split of the formation. In the case of the advanced embodiments when optimizing the merge and/or split waypoints this could be taken into account and the merge and/or split waypoints can be chosen as a compromise between fuel savings and arrival time impact for either aircraft of the pair.

Additionally, identifying pairs of interest in the coarse filter step 104 could be rendered more precise and reliable by analyzing flight history data, with or without formation flight, tracks flown, weather history and future predictions, schedules and delay statistics, rerouting occurrences, etc.

Further, the first criteria 108, 108' may include: types of aircraft; same airline/or other airline with which an agreement has been reached (flying into formation may require the leader's pilots to follow special procedures, including for communications); airline preferences for pairing choices; and, air traffic management constraints on certain regions might affect the pairing possibilities.

For a given aircraft pair, if both aircraft have the capability of playing the leader and the follower role, both leader-follower combinations should be tested. A pair could be of interest in one leader-follower combination and not in the other. It could also be generating interesting fuel savings in both combinations. In that case, the process 100, 100', 100" may provide a choice when assigning the roles in step 116.

A large-scale optimization of departure schedules could allow maximizing the fuel savings of a whole fleet or even of the entire aviation industry. Adapting schedules would facilitate closing gaps between leader and follower aircraft of a given pair and even allow to decide the combinations of flights to be paired together, and so enable setting up the most profitable combinations of aircraft models to fly together in formation. Moreover, adapting takeoff schedules would allow to minimize distances between leader and follower aircraft of a given pair, and so minimize effort of closing the gap and getting into the formation flight position. This potential large-scale optimization would of course need to satisfy airline preferences and flexibility, and air traffic constraints as well.

As commercial aircraft generate two trailing wake vortices, it is contemplated to have an aircraft behind on either one of the two upwash regions. It is further contemplated to have a leader aircraft followed by a second aircraft which is also playing the leader role for a third following aircraft. Following this logic, it is contemplated to provide large groups of aircraft flying in formation. For the sake of simplicity, the present disclosure has only considered a pair of two aircraft, a leader and a follower, but the process explained supra applies for any pair of neighboring aircraft in a formation of a larger number.

The different embodiments of the present invention described above include modifying existing flight plans included in a database of future flights. Nevertheless, it should be understood that the described embodiments of the process contain all the steps needed not only to modify existing flight plans, but also to create new flight plans from scratch if needed.

Accordingly, it is possible, with the present processes, to identify a pair of aircraft of interest from a database of future flights, not necessarily including the associated flight plans of the flights. A flight typically includes an identified aircraft type and airline, an identified departure and destination airport, and an identified time of departure and time of arrival. The present processes could create initial flight plans not including the fuel saving formation flight operation for one or both follower and leader aircraft of a given pair of flights identified in the database. It could then create the associated new follower and leader aircraft flight plans including the follower aircraft flying in the upwash of the leader aircraft's wake vortices and saving fuel, before finally, determining if there is a net trip fuel savings for the pair.

The created initial flight plans utilized in the coarse filtering step using criteria 108, 108' could be based on past flight plans or even recorded past flights instead of future flight plans. Utilizing the historical flight data would allow the process to do a coarse filtering step of a large number of future flights. After comparing the created initial flight plan(s) and the created new flight plan(s), the process may update the database of flights with the new flight plan(s) of the follower aircraft and of the leader aircraft.

It is contemplated that the coarse filtering criteria could be based on a history of pairs which are known to be of interest once the fuel saving flight formation operations have gained maturity and become usual, and airlines are confident with the quality and benefit of the pairs of interest provided by the present processes.

Accordingly, the process would not require using initial flight plans of the follower and leader aircraft, both historical and of future flights. Rather, for a given pair of flights identified in the database, the processes would directly create the flight plans of both the follower and leader aircraft wherein the flight plan of the follower aircraft includes a common ground section which overlaps with the flight plan of the leader aircraft so that the follower aircraft is flying in an upwash region of the leader aircraft's wake vortices and saving fuel. The process would then update the database of flights with the new flight plans of the follower aircraft and of the leader aircraft.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CD-ROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A process for saving fuel in an aircraft by adjusting the flight plans of the two aircraft, the process comprising:
   identifying a possible pair of aircraft from a database of aircraft flight plans, the possible pair of aircraft including a leader aircraft and a follower aircraft, each aircraft having an initial flight plan;
   providing a new flight plan for the leader aircraft by modifying the initial flight plan of the leader aircraft;
   providing a new flight plan for the follower aircraft by modifying the initial flight plan of the follower aircraft, wherein the new flight plan of the follower aircraft includes a common ground section which overlaps with the new flight plan of the leader aircraft so that the follower aircraft flies in an upwash region of wake vortices of the leader aircraft;
   determining when there is a net trip fuel savings associated with the possible pair of aircraft based on the leader aircraft utilizing the new flight plan and the follower aircraft utilizing the new flight plan instead of using the initial flight plans by continuously applying a criteria between a merge point and a split point, the merge point representing an initial waypoint in the common ground section and the split point representing a final waypoint in the common ground section, wherein the criteria comprise continuously comparing the speed envelope of the leader aircraft with the speed envelope of the follower aircraft making sure that any given Mach number and altitude the leader aircraft and the follower aircraft fly at together is compatible with their respective flyable domains of speed and altitude;
   when there is a net trip fuel savings and when the second criteria is satisfied, replacing the initial flight plans of both the leader aircraft and the follower aircraft in the database with the new flight plans;
   flying the leader aircraft along the new flight plan of the leader aircraft; and,
   flying the follower aircraft along the new flight plan of the follower aircraft.

2. The process of claim 1, wherein identifying a possible pair of aircraft from a database of aircraft flight plans comprises:
   applying a pair criteria to the database of aircraft flight plans.

3. The process of claim 2, wherein the pair first criteria comprise:
   determining that the leader aircraft and the follower aircraft are both airborne at the same time; or,
   determining that the initial flight plan of the leader aircraft and the initial flight plan of the follower aircraft have an overlapping section; or,
   determining that the initial flight plan of the leader aircraft and the initial flight plan of the follower aircraft have an overlapping section and that the two aircraft are not further than 300 NM apart at a beginning of the overlapping section; or,
   a combination thereof.

4. The process of claim 2, wherein the pair criteria comprise:
   determining that the leader aircraft and the follower aircraft are both airborne at the same time; or,
   determining that the initial flight plan of the leader aircraft and the initial flight plan of the follower aircraft have the same general direction; or,
   determining that a maximum allowable added travel distance of 700 NM for the follower aircraft is not exceeded; or
   determining that the two aircraft are not further than 300 NM apart at a beginning of the overlapping section, whether the overlapping section is resulting from the initial flight plan of the follower aircraft or the new flight plan of the follower aircraft; or
   a combination thereof.

5. The process of claim 1, wherein modifying the flight plans of the leader and/or the follower aircraft comprises:
   adjusting a speed, an altitude, or both.

6. The process of claim 1, wherein modifying the flight plans of the leader and/or the follower aircraft comprises:
   adjusting a speed, an altitude, or both to fly at a common speed and altitude with the other aircraft from at least the merge point to the split point.

7. The process of claim 1, wherein modifying the flight plans of the leader and/or follower aircraft comprises:
   adjusting the merge point, the split point, or both.

8. The process of claim 1, wherein determining if there is a fuel savings associated with the possible pair of aircraft comprises:
   determining takeoff weights of both the follower aircraft and the leader aircraft;
   determining a weight of the leader aircraft throughout the initial flight plan of the leader aircraft;
   determining a weight of the leader aircraft throughout the new flight plan of the leader aircraft;
   determining a weight of the follower aircraft throughout the initial flight plan of the follower aircraft; and,
   determining a weight of the follower aircraft throughout the new flight plan.

9. A process for saving fuel by adjusting the flight plans of two aircraft, the process comprising:
   identifying a possible pair of aircraft from a database of aircraft flight plans, the possible pair of aircraft including a leader aircraft and a follower aircraft, each aircraft having an initial flight plan, and each initial flight plan having a plurality of waypoints along the flight plan;
   providing a new flight plan for the leader aircraft by modifying the initial flight plan of the leader aircraft;

wherein the new flight plan of the leader aircraft includes at least one new waypoint that is not in the initial flight plan of the leader aircraft;

providing a new flight plan for the follower aircraft by modifying the initial flight plan of the follower aircraft, wherein the new flight plan of the follower aircraft includes a common ground section which overlaps with the new flight plan of the leader aircraft so that the follower aircraft flies in an upwash region of the wake vortices of the leader aircraft, and wherein the new flight plans of the follower aircraft includes at least one new waypoint that is not in the initial flight plan of the follower aircraft;

determining when there is a net trip fuel savings associated with the possible pair of aircraft based on both of the aircraft utilizing the new flight plans instead of the respective initial flight plans by continuously applying a criteria between a merge point and a split point, the merge point representing an initial waypoint in the common ground section and the split point representing a final waypoint in the common ground section, wherein the criteria comprise continuously comparing the speed envelope of the leader aircraft with the speed envelope of the follower aircraft making sure that any given Mach number and altitude the leader aircraft and the follower aircraft fly at together is compatible with their respective flyable domains of speed and altitude;

when there is a net trip fuel savings and when the second criteria is satisfied, replacing the initial flight plans in the database with the new flight plans;

flying the leader aircraft along the new flight plan of the leader aircraft; and, flying the follower aircraft along the new flight plan of the follower aircraft.

10. The process of claim 9,
wherein the merge point is based on a new waypoint from the at least one new waypoint that is not in the initial flight plan of the follower aircraft.

11. The process of claim 9,
wherein the split point is based on a new waypoint from the at least one new waypoint that is not in the initial flight plan of the follower aircraft.

12. The process of claim 9,
wherein the split point is based on a first new waypoint from the at least one new waypoint that is not in the initial flight plan of the follower aircraft, and
wherein the merge point is based on a second new waypoint from the at least one new waypoint that is not in the initial flight plan of the follower aircraft.

13. The process of claim 9,
wherein the merge point is based on a new waypoint from the at least one new waypoint that is not in the initial flight plan of the leader aircraft.

14. The process of claim 9,
wherein the split point is based on a new waypoint from the at least one new waypoint that is not in the initial flight plan of the leader aircraft.

15. The process of claim 9,
wherein the split point is based on a first new waypoint from the at least one new waypoint that is not in the initial flight plan of the leader aircraft, and
wherein the merge point is based on a second new waypoint from the at least one new waypoint that is not in the initial flight plan of the leader aircraft.

16. A process for saving fuel by creating flight plans of the two aircraft, the process comprising:
identifying a possible pair of aircraft from a database of flights, the possible pair of aircraft including a leader aircraft and a follower aircraft;
creating an initial flight plan of the leader aircraft;
creating an initial flight plan of the follower aircraft;
creating a new flight plan of the follower aircraft, wherein the new flight plan of the follower aircraft includes a common ground section which overlaps with the flight plan of the leader aircraft so that the follower aircraft flies in an upwash region of the wake vortices of the leader aircraft;
determining when there is a net trip fuel savings associated with the possible pair of aircraft based on the leader aircraft utilizing the new flight plan and the follower aircraft utilizing the new flight plan instead of the respective initial flight plans by continuously applying a criteria between a merge point and a split point, the merge point representing an initial waypoint in the common ground section and the split point representing a final waypoint in the common ground section, wherein the criteria comprise continuously comparing the speed envelope of the leader aircraft with the speed envelope of the follower aircraft making sure that any given Mach number and altitude the leader aircraft and the follower aircraft fly at together is compatible with their respective flyable domains of speed and altitude; and,
when there is a net trip fuel savings and when the second criteria is satisfied, updating the database of flights with the new flight plan of the follower aircraft and the new flight plan of the leader aircraft;
flying the leader aircraft along the initial flight plan of the leader aircraft; and,
flying the follower aircraft along the new flight plan of the follower aircraft.

17. The process of claim 16, wherein the initial flight plan of the follower aircraft, the initial flight plan of the leader aircraft, or both are based on a past flight plan or a past flight.

* * * * *